United States Patent
Chang et al.

(10) Patent No.: US 10,830,606 B2
(45) Date of Patent: Nov. 10, 2020

(54) SYSTEM AND METHOD FOR DETECTING NON-MEANINGFUL MOTION

(71) Applicant: Invensense Inc., San Jose, CA (US)

(72) Inventors: Hsui-Wen Chang, Calgary (CA); Jacques Georgy, Calgary (CA)

(73) Assignee: InvenSense, Inc., San Jose, CA (US)

( * ) Notice: Subject to any disclaimer, the term of this patent is extended or adjusted under 35 U.S.C. 154(b) by 208 days.

(21) Appl. No.: 14/617,681

(22) Filed: Feb. 9, 2015

(65) Prior Publication Data
US 2016/0231109 A1    Aug. 11, 2016

(51) Int. Cl.
G01C 22/00    (2006.01)
G06K 9/00    (2006.01)
G01P 13/00    (2006.01)

(52) U.S. Cl.
CPC ........... *G01C 22/006* (2013.01); *G01P 13/00* (2013.01); *G06K 9/00348* (2013.01)

(58) Field of Classification Search
None
See application file for complete search history.

(56) References Cited

U.S. PATENT DOCUMENTS

| | | | | |
|---|---|---|---|---|
| 5,929,400 A * | 7/1999 | Colby | ...................... | H02P 21/16 187/290 |
| 9,529,089 B1 * | 12/2016 | Buether | ................... | G01S 19/05 |
| 2008/0158154 A1 * | 7/2008 | Liberty | ................. | G06F 1/3215 345/158 |
| 2009/0007661 A1 * | 1/2009 | Nasiri | ...................... | G01P 1/023 73/504.03 |
| 2011/0029277 A1 * | 2/2011 | Chowdhary | ......... | G01C 21/165 702/150 |
| 2011/0054833 A1 * | 3/2011 | Mucignat | ................ | G06F 3/017 702/150 |
| 2012/0083705 A1 * | 4/2012 | Yuen | .................... | A61B 5/0002 600/508 |
| 2012/0136573 A1 * | 5/2012 | Janardhanan | ........ | G01C 21/165 701/512 |
| 2012/0194426 A1 * | 8/2012 | Mathews | ................ | G06F 3/038 345/157 |
| 2012/0203487 A1 * | 8/2012 | Johnson | .................. | G01P 21/00 702/104 |
| 2012/0303271 A1 * | 11/2012 | Chowdhary | ......... | A61B 5/0022 701/433 |
| 2013/0131555 A1 * | 5/2013 | Hook | ...................... | A61B 5/112 600/595 |
| 2015/0316383 A1 * | 11/2015 | Donikian | ............. | G01C 22/006 701/408 |
| 2015/0316576 A1 * | 11/2015 | Pakzad | ................... | G01P 13/00 702/141 |
| 2016/0258778 A1 * | 9/2016 | Cochran | ............. | G01C 21/165 |

* cited by examiner

*Primary Examiner* — Shaun M Campbell
(74) *Attorney, Agent, or Firm* — Bay Area Technology Law Group

(57) ABSTRACT

This disclosure relates to detecting non-meaningful motion with a portable device. In one aspect, a suitable method includes detecting motion with a portable device by obtaining inertial sensor data representing motion of the portable device, wherein the inertial sensor data includes accelerometer data and gyroscope data, processing the accelerometer data, processing the gyroscope data and identifying non-meaningful motion of the portable device based, at least in part, on the processed accelerometer data and the processed gyroscope data.

41 Claims, 23 Drawing Sheets

SYSTEM AND METHOD FOR DETECTING NON-MEANINGFUL MOTION

FIELD OF THE PRESENT DISCLOSURE

This disclosure generally relates to techniques for detecting motion employing a portable device and more specifically to determining when the detected motion is not meaningful.

BACKGROUND

Portable electronic devices, such as those configured to be handheld or otherwise associated with a user, are employed in a wide variety of applications and environments. The ubiquity of such devices as mobile phones, digital still cameras and video cameras, handheld music and media players, portable video game devices and controllers, mobile internet devices (MIDs), personal navigation devices (PNDs), wearables and other similar devices indicates the popularity and desire for these types of devices. Increasingly, such devices are equipped with one or more sensors or other systems for determining the position or motion of the portable device. Notably, a portable device that detects motion may be used to characterize on foot motion of a user. For example, motion sensor data may be processed to determine when a step of the user causes a corresponding pattern of data. In turn, the number of user steps along with a suitable estimation of user's step length of the user may provide valuable information regarding distances moved by the portable device.

Exemplary applications for such capabilities are to provide the user with navigational assistance and to enable location awareness so that the device may provide data relevant to the geographical position of the user or otherwise customize operation of the device. Often, improved results may be obtained by combining or fusing information from multiple sources. As such, use of properly characterized on foot motion may be synthesized with other navigational techniques, including reference-based and self-contained systems. For example, reference-based strategies may include satellite-based navigation, such as a Global Navigation Satellite System (GNSS), and signal trilateration using wireless local area networks (WLANs) or cellular telecommunication systems, while self-contained strategies may include dead reckoning determinations based upon the integration of specific forces and angular rates measured by inertial sensors (e.g. accelerometer, gyroscopes) integrated into the device.

Accurate characterization of on foot motion may be used in a wide variety of other uses as well. Performance in the context of personal fitness applications, such as activity tracking or pedometer measurements, directly depends on the ability to properly correlate detected motion of the portable device with movement of the user.

One challenge associated with these and other embodiments is the difficulty associated with discriminating when motion detected by the sensors of the portable device corresponds to physical translocation of the user. In particular, many situations exist in which the user may interact with the portable device, causing it to detect motion, but the user is actually stationary and not moving from one location to another. For example, the user may be employing the portable device for another function, such as texting or phoning in the case of mobile phone, in a manner that generates one or more patterns of sensor data that may be mistaken for the step of the user. Further, the user may simply be playing or fidgeting with the portable device, which may also result in motion that may be misidentified. For the purposes of this disclosure, "meaningful motion" refers to detected motion that corresponds to movement of the user from one physical location to another and "non-meaningful motion" refers to detected motion that does not.

Accordingly, it would be desirable to provide techniques for identifying detected motion of a portable device as being non-meaningful motion. Similarly, it would be desirable to use such identifications to improve characterization of on foot or other motion that results in movement from one location to another. As will be appreciated from the following materials, this disclosure satisfies these and other goals.

SUMMARY

As will be described in detail below, this disclosure includes methods for detecting non-meaningful motion with a portable device. In one aspect, a suitable method includes detecting motion with a portable device by obtaining inertial sensor data representing motion of the portable device, wherein the inertial sensor data includes accelerometer data and gyroscope data, processing the accelerometer data, processing the gyroscope data and identifying non-meaningful motion of the portable device based, at least in part, on the processed accelerometer data and the processed gyroscope data.

This disclosure also includes a portable device for detecting motion having an inertial sensor integrated with the portable device configured to output accelerometer data and gyroscope data and a non-meaningful motion detector configured to process the accelerometer data, process the gyroscope data and identify non-meaningful motion of the portable device based, at least in part, on the processed accelerometer data and the processed gyroscope data.

DETAILED DESCRIPTION

Figure 1:
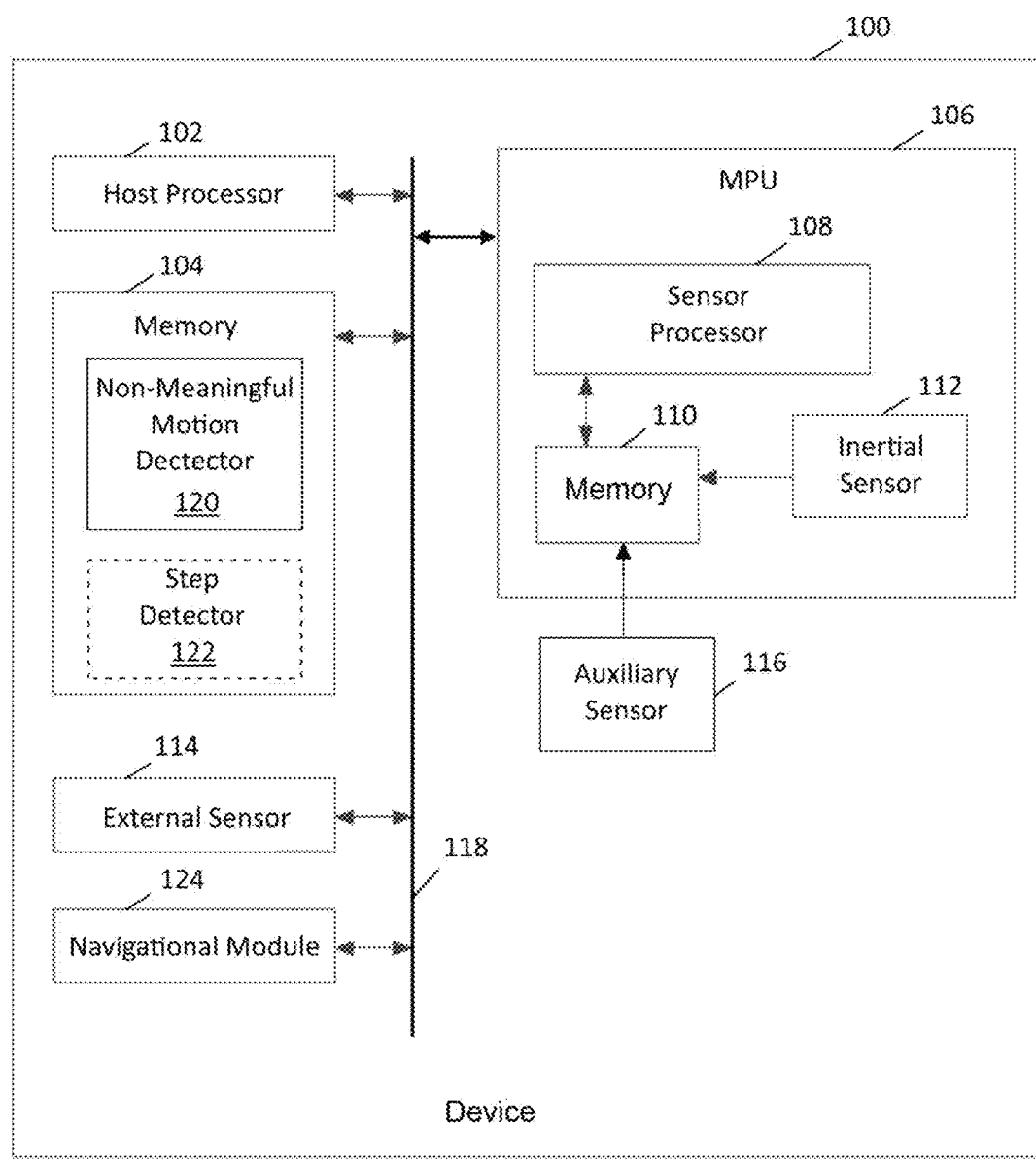
FIG. 1 is schematic diagram of a portable device for detecting motion according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration." and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Many mobile devices, such as mobile phones, tablets, smart watches, smart glasses, belt clips and other APPlication acCESSORIES (or Appcessories for short), are equipped with Micro Electro Mechanical System (MEMS) sensors that are used predominantly for screen control and entertainment applications. These sensors have not been broadly used to date for navigation purposes due to very high noise, large random drift rates, and frequently changing orientations with respect to the carrying platform or person. Magnetometers are also found within many mobile devices. In some cases, it has been shown that a navigation solution using accelerometers and magnetometers may be possible if the user is careful enough to keep the device in a specific orientation with respect to their body, such as when held carefully in front of the user after calibrating the magnetometer.

As such, there is a need for a navigation solution capable of accurately utilizing measurements from a device within a platform to determine the navigation state of the device/platform without any constraints on the platform (i.e. in indoor or outdoor environments) or the mobility of the device. It is further desirable that the estimation of the position and attitude of the platform be independent of the usage of the device (e.g. the way the user is holding or moving the device during navigation).

In addition to the above mentioned application of portable devices, such as for example smart phones and tablets, (that may involve a full navigation solution including position, velocity and attitude, or position and attitude), there are other applications (that may involve estimating a full navigation solution, or an attitude only solution or an attitude and velocity solution) where the method to mitigate the aforementioned problems is needed for enhancing the user experience and usability, and may be applicable in a number of scenarios, including the non-limiting examples of video gaming equipment, augmented reality equipment, wearable computing devices (such as for example smart wrist watches, and smart glasses) and other appcessories.

The main challenge is that the low-cost MEMS sensors in current wearable computing devices, appcessories, or even portable devices are considered insufficient for reliable navigation purposes due to very high noise, large random drift rates, and especially for such mobile devices that can freely change orientation with respect to the platform or person. Some prior solutions to overcome such limitations of the sensors errors is through better error modeling, however this is challenging for portable navigation which must accommodate varying orientation with respect to the platform or person. Thus, the techniques of this disclosure for identifying non-meaningful motion may be used to improve such navigational solutions, as well as providing useful information for other applications, such as personal fitness.

As noted above, a portable device embodying aspects of this disclosure may include inertial sensors used for detecting motion of the portable device and may identify non-meaningful motion to determine when detected motion does not correspond to movement of the user between physical locations. This may include on foot motion, such as walking, running and other similar forms of locomotion involving the periodic repetition of steps. Similarly, other types of movement between physical locations may also exhibit periodic motion, including swimming, cycling/biking, skiing, rowing and others. Further, the techniques of this disclosure may also be applied to discriminate when detected motion of the device is not associated with another type of conveyance, such as riding in a vessel or on an animal. A vessel may be any land-based, marine or airborne vehicle or other mode of transport. Aspects of this disclosure may be described in the context of a representative portable device, such as device 100 as depicted in FIG. 1 with high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), personal digital assistant (PDA), video game player, video game controller, navigation device, wearable device (e.g., glasses, watch, belt clip), tablet, fitness tracker, mobile internet device (MID), personal navigation device (PND), digital still camera, digital video camera, binoculars, telephoto lens, portable music, video, or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated motion processing unit (MPU™) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, MPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using MEMS to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 1007, and Ser. No. 12/106,921, filed Apr. 11, 1008, which are hereby incorporated by reference in their entirety. Suitable implementations for MPU 106 in device 100 are available from InvenSense, Inc. of Sunnyvale, Calif.

Alternatively, or in addition, device 100 may implement a sensor assembly in the form of external sensor 114. External sensor may represent one or more sensors as described above, such as an accelerometer and/or a gyroscope, that measures parameters for characterizing on foot motion. As used herein, "external" means a sensor that is not integrated with MPU 106 and may be remote or local to device 100. Also alternatively or in addition, MPU 106 may receive data from an auxiliary sensor 116 configured to measure one or more aspects about the environment surrounding device 100. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, MPU 106 and other components of device 100 may be coupled through bus 118, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to characterize a user's motion may be implemented through non-meaningful motion detector 120 as a set of suitable instructions stored in memory 104 that may be read and executed by host processor 102. Other embodiments may feature any desired division of processing between host processor 102, MPU 106 and other resources provided by device 100, or may be implemented using any desired combination of software, hardware and firmware. Further, in some embodiments, device 100 may also include a periodic motion detector, which may be a step detector 122 in case of on foot motion, to process measurements reflecting motion of the device, such as those output by inertial sensor 112, to characterize periodic motion of the user, such as on foot motion of the user. This may include determining that the user has made a possible periodic cycle, such as the user has taken a step in case of on foot motion. Further details regarding suitable implementations of step detector 122 may be found in commonly-assigned, co-pending U.S. patent application Ser. No. 14/502,168, filed Sep. 30, 2014, which is hereby incorporated by reference in its entirety. Likewise, although step detector 122 is depicted as software stored in memory 104 for execution by host processor 102, it may be implemented using any desired combination of software, hardware and firmware representing any allocation of processing resources available to device 100. As indicated by the dashed box, step detector 122 is optional and may not be required for applications such as when the user is traveling in a vessel or is otherwise being conveyed. In some embodiments, step detector 122 may be replaced with or used in conjunction with another motion detector such as a periodic motion detector configured to detect other types of periodic motion involving a sequence of periodic cycles that may be associated with movement of the user as described above, including swimming, rowing, cycling, etc or a conveyed motion detector to detect when the user is riding in a vessel or similarly being conveyed.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and MPU 106, for example, to transmit desired sensor processing tasks. As such, aspects implemented in software may include but are not limited to, application software, firmware, resident software, microcode, etc, and may take the form of a computer program product accessible from a computer-usable or computer-readable medium providing program code for use by or in connection with a computer or any instruction execution system, such as host processor 102, sensor processor 108, a dedicated processor or any other processing resources of device 100.

Device 100 may also include navigational module 124 that employs a reference-based strategy, a self-contained strategy, or any combination of strategies. Navigational module 124 may provide any desired degree of location awareness capabilities. Representative technologies that may be embodied by navigational module 124 include global positioning system (GPS), global navigation satellite system (GLONASS), Galileo and Beidou, as well as WiFi™ positioning, cellular tower positioning, Bluetooth™ positioning beacons, dead reckoning or other similar methods. Navigational module 124 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed.

Figure 2:
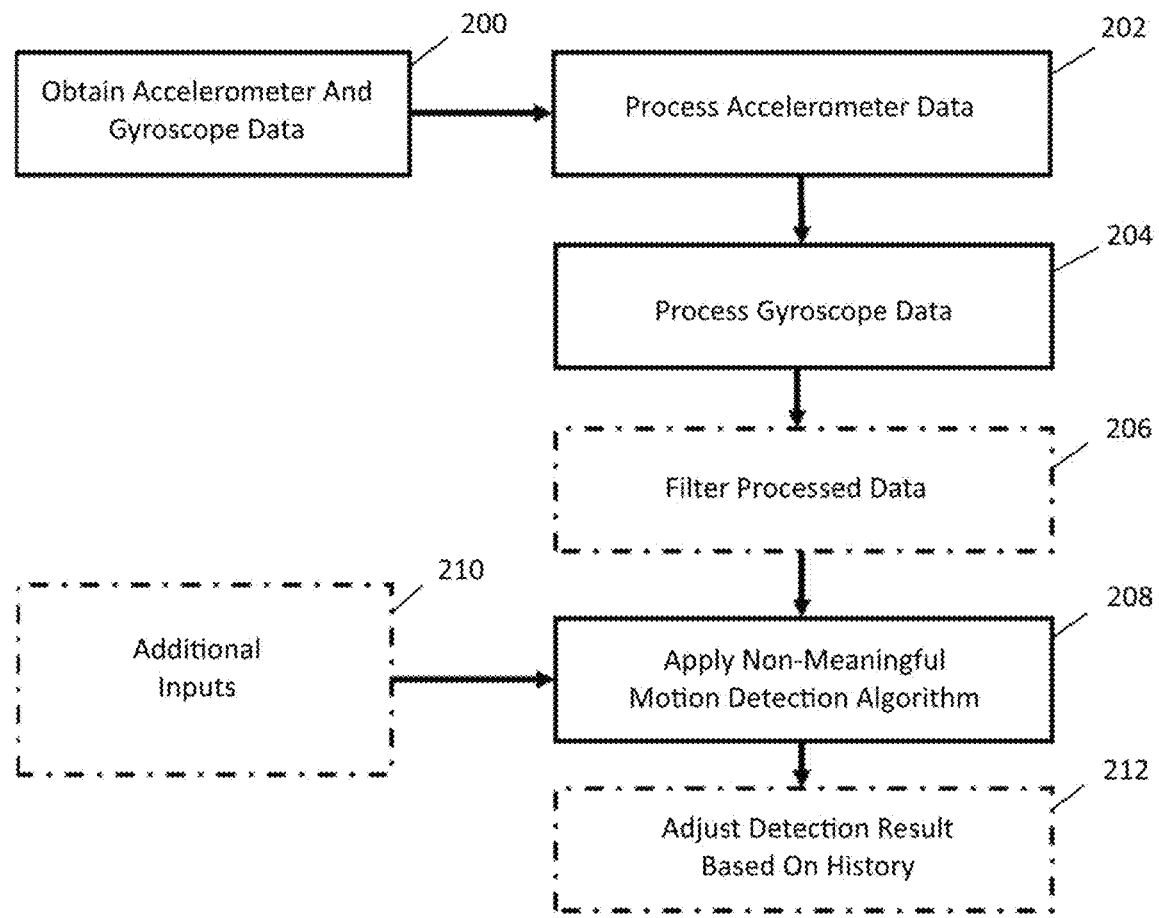
FIG. 2 is a flowchart showing a routine for identifying non-meaningful motion according to an embodiment.

Representative operations that may be performed by non-meaningful motion detector 120 are depicted in the flow chart of FIG. 2. Beginning with 200, accelerometer and gyroscope data may be obtained that represents motion of device 100, such as from inertial sensor 112 or any other suitable sources of measurement, including external sensor 114. As shown, the accelerometer data may be processed in 102. In some embodiments, this may include leveling the data to isolate vertical components and/or subtracting gravity as described in further detail below. Further, the gyroscope data may be processed in 104. In some embodiments, this may include deriving magnitudes associated with the gyroscope data and/or isolating horizontal components, as also described below.

Optionally, in 206 the processed inertial sensor data may be filtered. In one aspect, this may include applying a low pass filter to smooth the data and reduce artifacts. Other suitable filtering operations may be applied as desired.

In 208, a non-meaningful motion detection algorithm may be applied to the processed inertial sensor data to assess whether the motion represented by the accelerometer and gyroscope data is associated with movement of the user between locations.

This algorithm may optionally incorporate additional inputs to facilitate or improve the detection as indicated by 210. For example, suitable additional factors may include information about the current horizontal and/or vertical velocity of device 100, such as may be obtained from a navigation solution. Another exemplary input is information concerning the current use of device 100, and whether the current use is associated with predictable orientations or patterns of movement. In some cases, the design of the device may determine how the device is typically associated with a user, such as a watch that may be affixed to the wrist or glasses that may be worn. Other devices may be associated with a user in multiple ways or may have expected use cases, such as a phone that may be carried in the hand or secured in a pocket and may also be used in varying contexts or orientations depending on use case, including relatively horizontal in a texting mode, relatively vertical when on ear in a calling mode or dangling when being carried but not actively used.

Following application of the non-meaningful motion detection algorithm in 208, the detection result may optionally be adjusted in 212 based, at least in part, on a history of device 100. For example, recent detections and measurements may be analyzed to determine if a current detection result is anomalous. Additionally, or in the alternative, the history of device 100 may be used to customize detections from previous patterns. In one aspect, device 100 may incorporate a training mode to establish expected patterns that may be used to validate subsequent detection results.

As noted above, the operations described as being performed by non-meaningful motion detector 120 may be performed by any number of routines or algorithms implemented by any combination of available processing resources. For example, initial processing of gyroscope and/or accelerometer data, such as associated with 202 and/or 204, may be performed by sensor processor 108 before being passed to host processor 104 for subsequent operations, such as the application of non-meaningful motion detection algorithm to the processed accelerometer and gyroscope data in 208.

The techniques of this disclosure may include methods of identifying non-meaningful motion.

In one aspect, processing the accelerometer data may include leveling the accelerometer data to obtain a vertical component.

In one aspect, processing the accelerometer data may include subtracting gravity from the obtained vertical component.

In one aspect, processing the gyroscope data may include determining a magnitude for the gyroscope data.

In one aspect, processing the gyroscope data may include leveling the gyroscope data to obtain a horizontal component.

In one aspect, identifying non-meaningful motion may be based at least in part on a statistical analysis.

In one aspect, identifying non-meaningful motion may be based at least in part on a frequency analysis.

In one aspect, identifying non-meaningful motion may include matching at least one of the accelerometer data and gyroscope data to a known pattern.

In one aspect, identifying non-meaningful motion may include adjusting a non-meaningful motion identification based, at least in part, on a history of non-meaningful motion identification for the portable device.

In one aspect, motion of the portable device may be classified, wherein identifying non-meaningful motion of the portable device is also based on a use case corresponding to the classified motion.

In one aspect, a navigation solution for the portable device may be derived from the inertial sensor data.

In one aspect, processing the accelerometer data may include leveling the accelerometer data using pitch and roll angles from the derived navigation solution to obtain a vertical component.

In one aspect, processing the gyroscope data may include leveling the gyroscope data using pitch and roll angles from the derived navigation solution to obtain a horizontal component.

In one aspect, a non-meaningful motion identification may be based, at least in part, on a vertical velocity of the portable device.

In one aspect, a navigation solution for the portable device may be derived from the inertial sensor data, wherein the vertical velocity is determined from the navigation solution.

In one aspect, a non-meaningful motion identification may be based, at least in part, on a horizontal velocity of the portable device.

In one aspect, a navigation solution may be derived for the portable device from the inertial sensor data, wherein the horizontal velocity is determined from the navigation solution.

In one aspect, a filtering operation may be performed.

In one aspect, periodic motion of a user of the portable device may be characterized and the characterization may be assessed based, at least in part, on the identification of non-meaningful motion.

In one aspect, characterizing periodic motion may include detecting at least one possible periodic cycle and wherein assessing the characterization may include overruling detection of the at least one possible periodic cycle.

In one aspect, a distance traveled by the portable device may be estimated based, at least in part, on the assessed characterization.

In one aspect, a navigational solution for the portable device may be updated based, at least in part, on the assessed characterization.

In one aspect, the periodic motion may be on foot motion.

In one aspect, the periodic motion may be on foot motion and the possible periodic cycle may be a step.

In one aspect, conveyed motion of a user of the portable device may be characterized and the characterization may be assessed based, at least in part, on the identification of non-meaningful motion.

In one aspect, the conveyed motion of the user may be transport in a vessel.

The techniques of this disclosure may include devices for identifying non-meaningful motion.

In one aspect, the device may include a step detector configured to characterize on foot motion of a user.

In one aspect, the device may include a navigational module configured to determine a navigation solution for the portable device.

In one aspect, the device may include a navigational module configured to determine a navigation solution for the portable device based, at least in part, on output from a step detector.

In one aspect, the output of the step detector may be assessed using the identification of non-meaningful motion.

In one aspect, the device may include a periodic motion detector configured to characterize on foot motion of a user.

In one aspect, the device may include a navigational module configured to determine a navigation solution for the portable device based, at least in part, on output from the periodic motion detector.

In one aspect, the output of the periodic motion detector may be assessed using the identification of non-meaningful motion.

In one aspect, the device may include a conveyed motion detector configured to characterize on foot motion of a user.

In one aspect, the device may include a navigational module configured to determine a navigation solution for the portable device based, at least in part, on output from the conveyed motion detector.

In one aspect, the output of the conveyed motion detector may be assessed using the identification of non-meaningful motion.

In one aspect, the inertial sensor is implemented as a Micro Electro Mechanical System (MEMS).

Non-limiting examples of device architectures and suitable techniques for applying non-meaningful motion detection algorithms are described in the material below.

Examples

Figure 3:
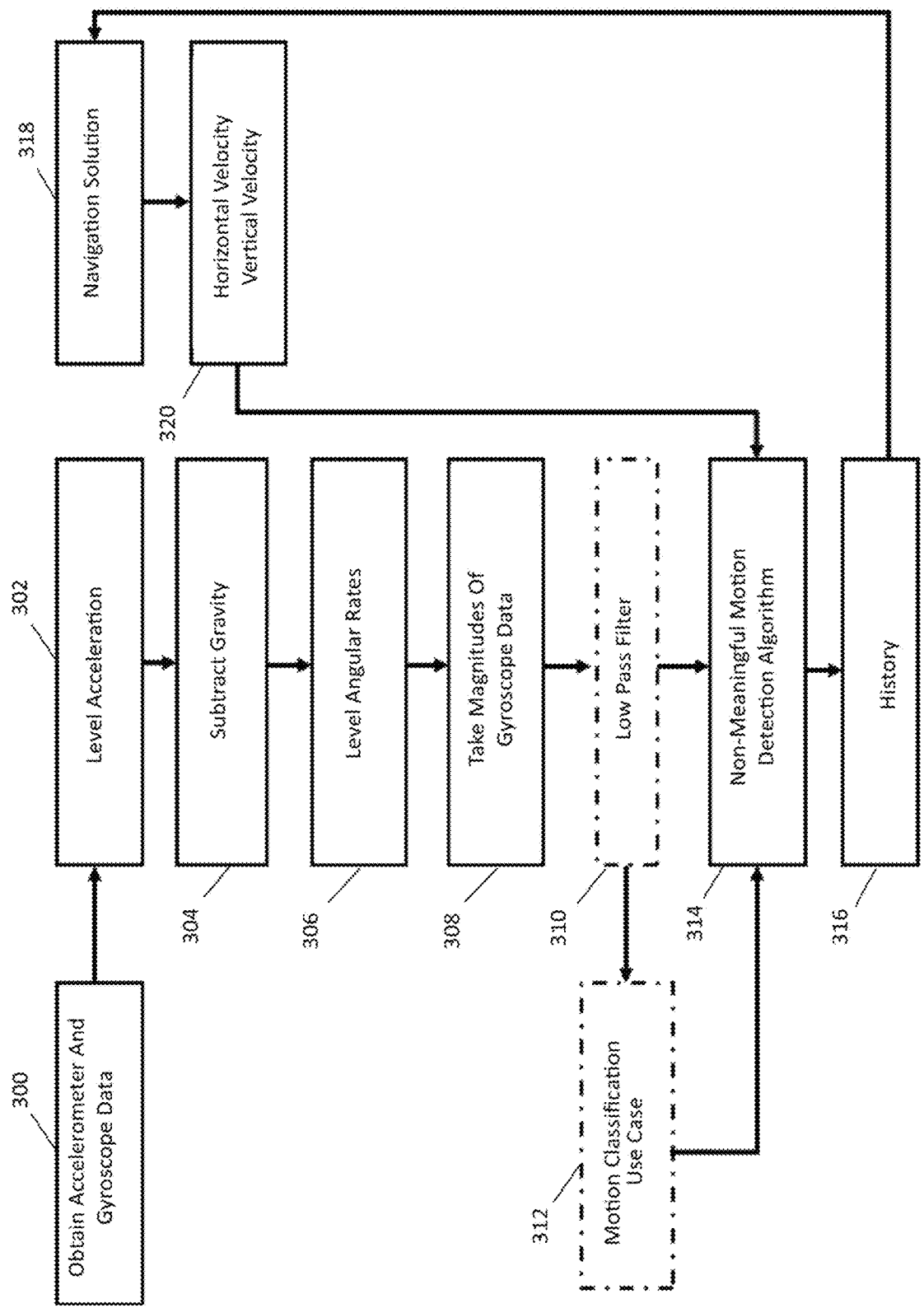
FIG. 3 is a flowchart showing another routine for identifying non-meaningful motion according to an embodiment.

One representative routine for detecting non-meaningful motion is depicted in the flow chart of FIG. 3. Beginning with 300, gyroscope and accelerometer data is obtained from a suitable source, such as inertial sensor 112. In 302, the accelerometer data is leveled using an estimated orientation of device 100 to isolate a vertical acceleration component and in 304, a force corresponding to gravity is removed from the signal to generate vector data_a. In 306, the gyroscope data is also leveled using the estimated orientation to isolate a horizontal component to generate vector data_g and in 308, the magnitude of the gyroscope data is taken to generate vector data_MAG. Optionally, filtering operation 310 may be performed on some or all of the processed inertial sensor data.

Then, in 312, a suitable non-meaningful motion detection algorithm may be applied to the vectors data_a, data_g and data_MAG, whether filtered or not in 310. In one aspect, the output of the non-meaningful motion detection algorithm may be used to validate detection of a step of the user. For example, the algorithm may return a positive detection of non-meaningful motion, in which data that would otherwise be taken as corresponding a detected step is instead treated as though no step were detected. Conversely, the algorithm may return a negative detection, such that a detected step will be treated as a step. Additionally, the algorithm may also output no decision when insufficient confidence exists to output either a positive or negative detection. The results of the non-meaningful motion detections may be stored to represent a history of device 100 in 316.

Also optionally, additional inputs in the form of information regarding predictable orientations or patterns of movement associated with device 100 may be employed in the non-meaningful motion detection algorithm as indicated by 314. In one aspect, a characterization of recent device orientation may be provided as a vertical transferred flag vector used to represent when the device's orientation has changed from horizontal to vertical. Further, a use case vector may be determined for device 100 that may be expected to affect orientation and/or motion. In one aspect, such inputs may refine an identification of motion as non-meaningful or determine whether to apply a non-meaningful motion detection, such as by validating a detected step despite a pattern of processed inertial sensor data that may otherwise indicate non-meaningful motion. For example, such techniques may be suitable when data_a is relatively inconsistent over a given window. As desired, any source of information regarding device 100 that may influence its expected orientation and/or motion pattern may be employed.

In this embodiment, application of the non-meaningful motion detection algorithm in 314 may also involve receiving inputs derived from a navigational solution. For example, a vertical velocity data_vvel vector and a horizontal velocity vector data_vel corresponding to the current motion of device 100 as extracted from an integrated navigation solution by the appropriate leveling operations. As noted above, device 100 may employ navigational module 124 to generate the navigation solution. As shown, the results of the non-meaningful motion detection algorithm may be fed to the navigation solution in 318 in a suitable fusion operation. Correspondingly, the vertical velocity data_vvel vector and horizontal velocity vector data_vel may be derived from a navigation solution that has been enhanced by the detection of non-meaningful motion.

As noted above, processing accelerometer and/or gyroscope data may include isolating components corresponding to vertical or horizontal motion, and any desirable technique may be employed. For example, Euler rotations may be used to translate the output of inertial sensor 112 from the coordinate system of device 100, or its body frame, to a suitable reference coordinate system, such as the local level frame. While the body frame may be established by the orthogonal axes of inertial sensor 112, the local level frame, as an illustration only and without limitation, may include any suitable reference, such as a North, East, Down (NED) convention, in which down is aligned with gravity, or East, North, Up (ENU). In the following discussion, the roll angle is defined as the angle that rotates around x-axis of the body frame while pitch angle is defined as the angle that rotates around y-axis (after levelling with roll angle). Other coordinate systems, reference frames and/or translation techniques such as quaternions may be used as desired. Transferring the measurements of inertial sensor 112 to the world frame allows for isolation of vertical or horizontal components as desired. In one aspect, the rotation may involve use of a direct cosine matrix (DCM) is built using the Euler angles (roll ($\phi$), pitch ($\theta$) and azimuth ($\psi$)) as indicated by Equation (1), which in turn may be used to convert inertial sensor measurements from the body frame to the world frame according to Equation (2).

$$DCM = \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix} \quad (1)$$

$$\begin{bmatrix} x \\ y \\ z \end{bmatrix} = DCM * \begin{bmatrix} x_{sensor} \\ y_{sensor} \\ z_{sensor} \end{bmatrix} \quad (2)$$

In another aspect, processing the accelerometer data may also include removing the force corresponding to gravity. For example, gravity g may be subtracted from the vertical component z obtained using Equation (2) to derive vector data_a as indicated by Equation (3).

$$data\_a = z - g \quad (3)$$

In yet another aspect, processing inertial sensor data may include the filtering operation 310 as discussed above. For example, a low pass filter may be employed to reduce high-frequency noise. When the amplitude of the acceleration data is small, human oscillatory motion from joints become significant in the accelerometer measurements. By applying a low pass filter, the data may be smoothed and made less dependent on short term changes. Desirably, a suitable non-meaningful motion detection algorithm may accommodate a broad range of use cases without limiting the manner in which the user employs or interacts with the device. However, this is to be balanced with recognizing patterns of processed data that do not correspond to locomotion of the user to properly identify non-meaningful motion. Performing a filtering operation, such as by applying a low pass filter, may advance these goals by reducing the effects of unexpected high frequency motions that might occur while the user is locomoting, such as might be caused by conditions involving unexpected impacts from joint flexibility, hand shaking, movement while loose in a pocket and the like. In one aspect, a filter with predetermined cut-off frequency (e.g., 4 Hz), may be applied to one or more of the vectors data_a, data_g and data_MAG to reduce the effect of sudden changes on the inertial sensor data.

As noted in the context of 312 of FIG. 3, information about a current use of device 100 that may influence its orientations or motion may be used as an input to the non-meaningful motion detection algorithm if desired. A determination of use case, or "motion classification," may distinguish motions into any suitable number of predetermined categories. For example, classification may be assigned using three use case categories: (i) device in the pocket with all possible variations and orientations; (ii) device dangling in hand with all possible variations and orientations; and (iii) all other use cases with all possible variations and orientations including handheld compass mode, talking near ear and others. Since both pocket and dangling movements involve not only trunk force but also additional force from the user's thigh or arm, the relationship between motion signal, vertical signal and attitude signal may be less consistent than for other use cases. However, these additional forces may also emphasize peaks in amplitude, facilitating peak detection and increasing the probability of deriving a correct solution.

Any suitable combination of techniques may be used to perform motion classification. For example, in a dangling use case, the amplitude of acceleration and gyroscope data may be significantly increased as compared to other use cases. Thus, inertial sensor data having these characteristics may be directly classified as dangling. As another example, derived statistics may be used to distinguish between dangling and pocket data sets. Providing multiple motion classifications may accommodate use cases having any number of orientations. Further, different criteria may be configured to identify characteristics of the user's motion, such as speed of walking or unpredictable walking behavior.

Any number of methods are known in the art for deriving experimental statistics values to be used in the motion classifications. For example, one suitable technique may involve obtaining inertial sensor data from multiple users of different gender at different walking speeds and different use cases. In one aspect, correlations between use cases and inertial sensor data may be investigated. Some walkers may have unexpected and/or irregular movements and thresholds used for peak detection may be adapted according to the amplitude of the obtained signals. Further, due to the additional force from thigh and arm as noted above, there may be a significant change or variation in the roll or pitch values according to the device orientation. As will be appreciated, orientations or motions associated with particular use cases may result in characteristic patterns of measurements. One illustrative example is that in dangling mode has a more consistent and smooth data_g signal than data_a when compared to pocket mode. In addition, the time difference between peaks may be more consistent in dangling mode because a pocket use case may be affected by difference between a left and right leg swing. As another example, light walkers may be accounted for by noting the data_a signal may be attenuated for such users, leading to a decreased signal to noise ratio. When the signal range of data_a is relatively small, it may be desirable to use the maximum peak amplitude of the signal to determine if a pocket use case may be in effect. As yet another example, suitable techniques for detecting a pocket mode use case may exploit a relationship that when a user's thigh moves forward, data_MAG and data_a may exhibit similar output patterns. Thus, detection of a pocket use case may be based on the relationship of attitude variation and shape between horizontal and vertical signals.

In one aspect, the non-meaningful motion detection algorithm may be used to enhance identification of steps taken by the user, such as the output from step detector 122. Depending on the embodiment and desired functionality, a combination of strategies and/or conditions may be employed. For example, conditions that may be detected during application of the non-meaningful motion detection algorithm may include inconsistent amplitude of vertical acceleration peaks (signal high and low points), inconsistent time difference between adjacent vertical acceleration peaks, unreasonable range of gyroscope magnitude or leveled gyroscope measurements, unreasonable mean values of input vectors, inconsistent frequencies detected by fast Fourier transform (FFT), and the like. Further, these conditions may vary dependent on the current use case of device 100. Accordingly, the motion classification techniques described above may be employed to determine which conditions to detect. When motion classification fails to determine a specific use case, a general use case may be employed. Detection of non-meaningful motion may also be improved by taking an average from the history of recent decisions.

Figure 4:
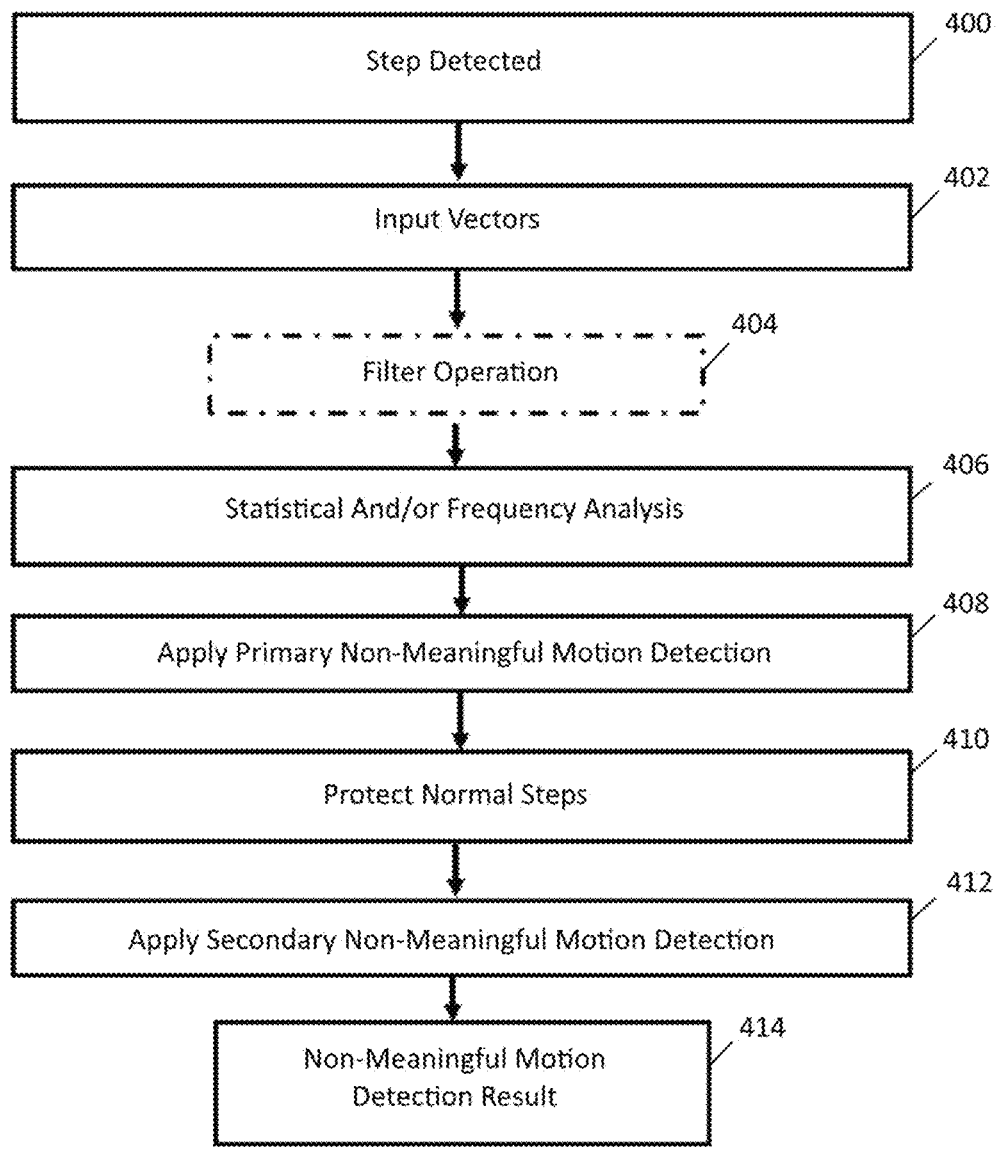
FIG. 4 is a flowchart showing details regarding a non-meaningful motion detection algorithm according to an embodiment.

Further details regarding one representative embodiment for applying a non-meaningful motion detection algorithm are shown in the flow chart of FIG. 4. As described above, the results of the non-meaningful motion detection algorithm may be used to validate or overrule a given detection of a user's step, such as received from step detector 122 in 400. The non-meaningful motion detection algorithm may receive a plurality of inputs in 402, including some or all of the vectors described above: data_a, data_g, data_MAG, vertical transfer flag, use case, data_vel and data_vvel. One or more optional filtering operations may be performed in 404, such as by applying a low pass filter. In 406, suitable statistical and/or frequency analyses may be performed on the inputs.

Depending on the results of these analyses, a primary non-meaningful motion detection may be made in 408. Examples include determining a range of measured vertical acceleration is below a threshold associated with a static user and determining a range of measured vertical acceleration is below another (typically larger) threshold in conjunction with a relatively large range of gyroscope magnitude and no detection of pocket or dangling use cases. Other examples include comparisons of statistics values and/or frequency characteristics as determined from FFT with patterns of vertical acceleration, downward velocity, gyroscope magnitude or the like. If a primary detection of non-meaningful motion is made, the routine may jump to the end and return a positive detection. Otherwise, the input vectors may be compared to known patterns associated with normal steps in 410. When a normal step pattern is matched, the routine may jump to the end and return a negative detection. If not, the routine progresses to 412 for application of a secondary detection of non-meaningful motion. This may include further processing of the analyses of 406 to determine whether irregular peaks exist, whether there are irregular frequencies between input signals, and other suitable conditions. From the results of 412 (or 408 or 410 as noted), a detection result may be output in 414. As noted above, the algorithm may return a positive detection of non-meaningful motion, such that the step detection of 400 is overruled, a negative detection, such that the step detection of 400 is validated, or no decision when insufficient confidence exists to output either a positive or negative detection. Depending on the application and desired performance, the step detection of 400 may be overruled or left unchanged when no decision is made regarding the detection of non-meaningful motion.

In one aspect, application of the non-meaningful motion detection algorithm involves determining whether the inputs are consistent with patterns of known, normal steps, so that such steps may be protected from a determination of non-meaningful motion. For example, some steps during normal walking do not have consistent amplitude for high peaks and low peaks, resulting from conditions such as switching from texting mode to on ear mode. Normal steps may also have irregular interval between peaks, such as in a pocket use case as noted above. Therefore, it may be desirable to protect signals having obvious steps shapes from being overruled by a non-meaningful motion detection. Since only a portion of the signal may correspond to a known pattern, one or more flags may be employed to adjust application of a non-meaningful motion detection. To help illustrate these principles, the following materials describe representative patterns and suitable techniques for accommodating them.

Figure 5:
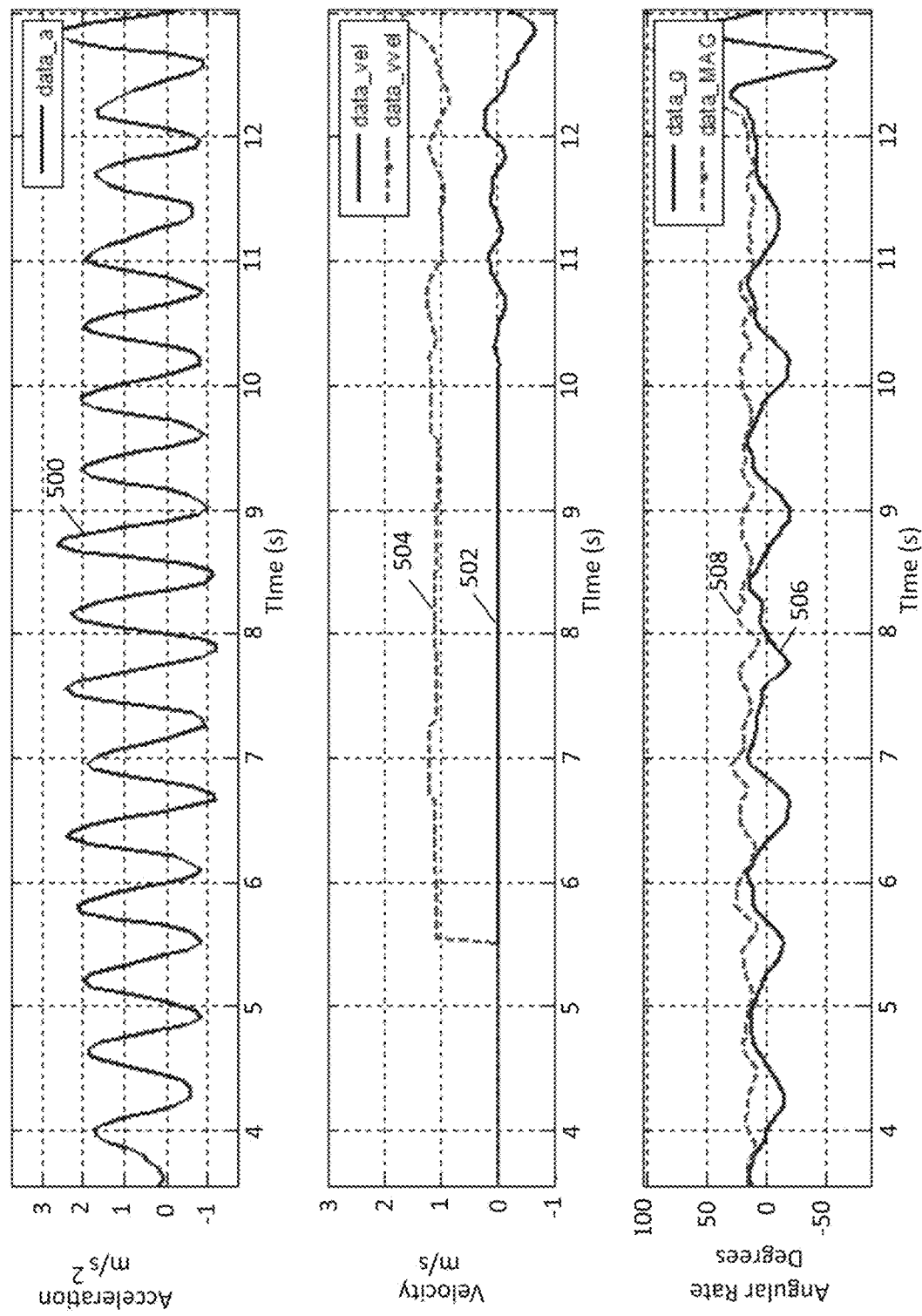
FIG. 5 is a graphical representation of inertial sensor data while walking at normal speed in a texting use case according to an embodiment.

One set of representative patterns may be associated with a user walking with device 100 held in a texting mode or compass mode. An initial aspect of the non-meaningful motion detection algorithm is finding peaks of the input signals. Different thresholds may be used for peak detection depending on the signal's condition. Further, the thresholds may be adjusted to accommodate different walking patterns of different users. For example, detection of peaks may include distinguishing a light walker from a normal walker using vertical data ranges predetermined by experiments. When no peak is detected, the threshold may be reduced if the range of all input signals are within reasonable values. Similarly, different ranges of acceleration, gyroscope magnitudes, leveled gyroscope measurements, and/or velocities may warrant application of different techniques. One expected pattern for input vectors while walking normally in compass mode is depicted in FIG. 5 As can be seen, while normal walking is taking place, the signals of the input vectors have periodic waves with different frequency and amplitude. Trace 500 in the top graph, representing data_a, is the measure of vertical acceleration and a consistent periodical signal over a suitable window (e.g., a few seconds) is a known pattern that corresponds to meaningful motion. In the middle graph, trace 502 represents the horizontal velocity derived from the navigation solution, data_vel and trace 504 represents the vertical velocity derived from the navigation solution, data_vvel. In the bottom graph, trace 506 represents the leveled gyroscope measurements, data_g, and trace 508 represents the magnitude of the gyroscope measurements, data_MAG. Trace 500 exhibits a consistent shape, as well as substantially consistent frequency and amplitude, while the user is walking normally and holding device 100 in. While the device is during alignment phase, the vertical velocity is zero as shown in the second sub axis in the first half window.

Figure 6:
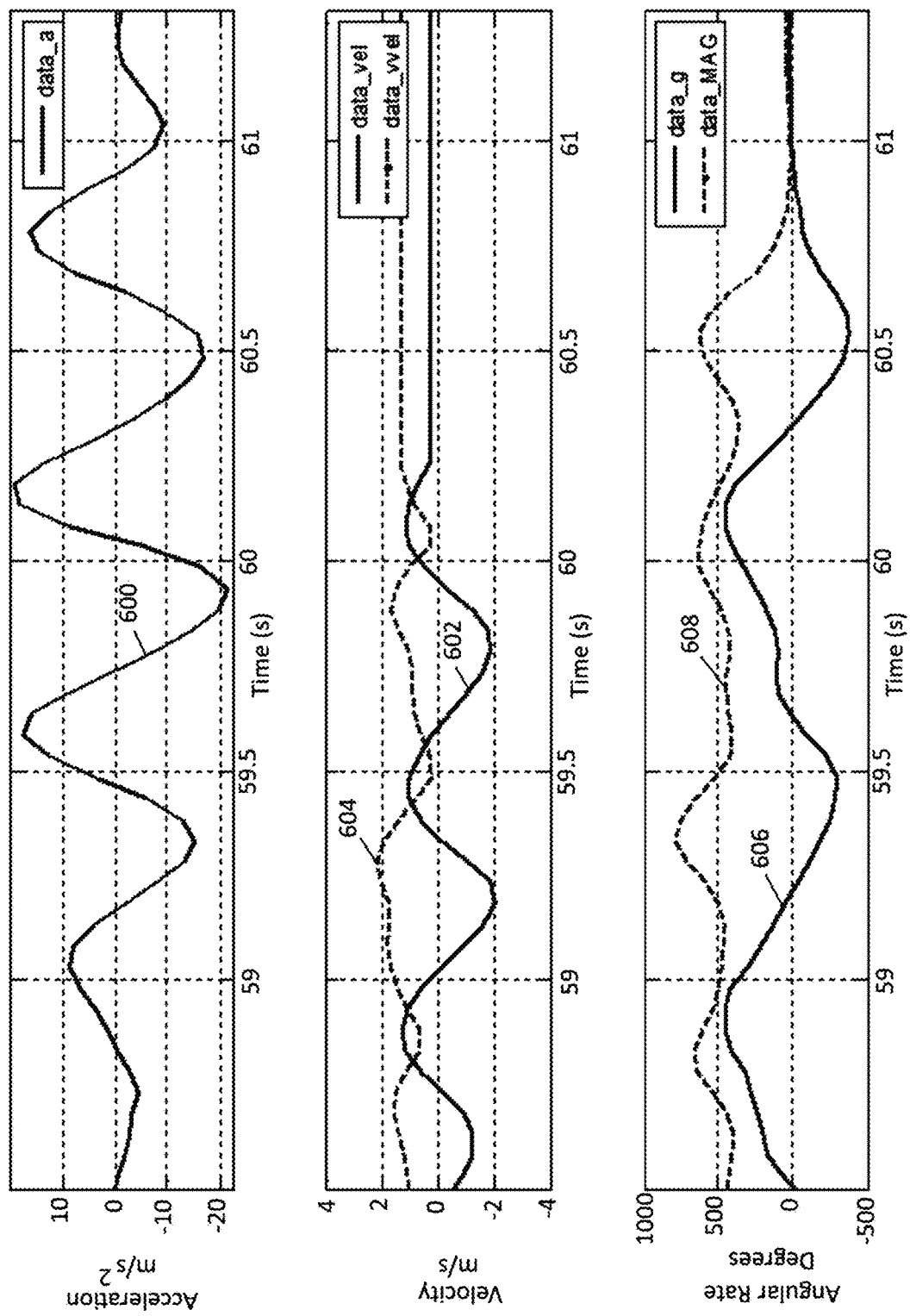
FIG. 6 is a graphical representation of inertial sensor data of non-meaningful motion according to an embodiment.

In comparison, signals that correspond to non-meaningful motion are depicted in FIG. 6. In the top graph, trace 600 represents data_a, in the middle graph, trace 602 represents data_vel and trace 604 represents data_vvel, and in the bottom graph, trace 606 represents data_g and trace 608 represents data_MAG. Although trace 600 has a substantially consistent shape, frequency and amplitude, other vectors may be employed in the non-meaningful motion detection algorithm. For example, since the signals shown in FIG. 6 do not correspond to a dangling use case, the range of data_MAG may warrant a positive non-meaningful motion detection as it is too large to be consistent with device 100 being held in hand. As a result, a step or steps that would other wise be detected may be overruled.

Figure 7:
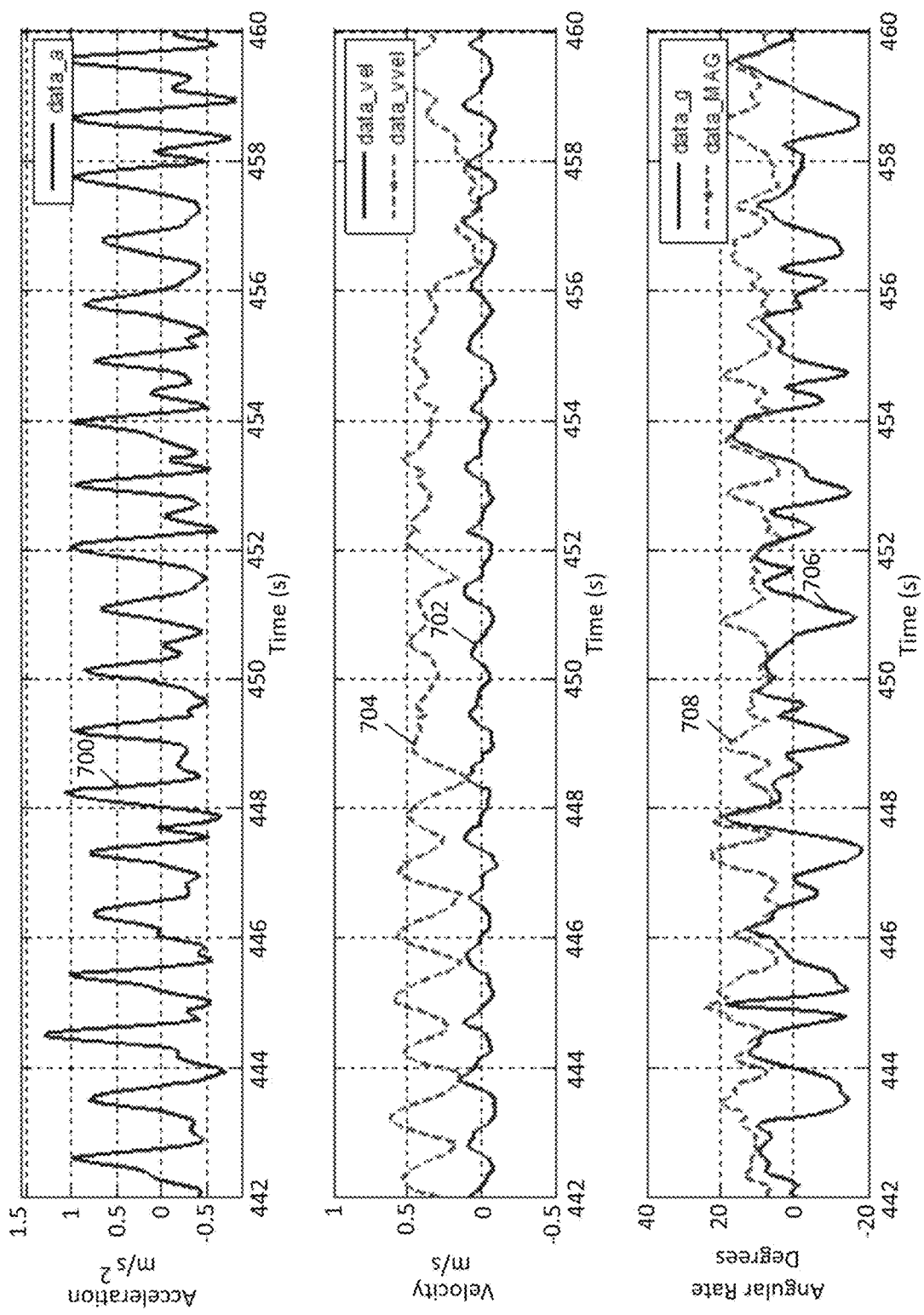
FIG. 7 is a graphical representation of inertial sensor data while walking at slow speed in a texting use case according to an embodiment.

Another illustrative example is depicted in FIG. 7 that corresponds to slow waking speed with a compass mode use case. In the top graph, trace 700 represents data_a, in the middle graph, trace 702 represents data_vel and trace 704 represents data_vvel, and in the bottom graph, trace 706 represents data_g and trace 708 represents data_MAG. Due to the slow waking speed, the vertical acceleration indicated by trace 700 is not as consistent. However, vertical acceleration does have two strong frequency components in the power spectrum. Accordingly, when the amplitude of vertical acceleration is relatively small and one of the significant frequency components coincide with the significant frequency components found in trace 706, an extended history of the vectors may be used rather than a relatively shorter window. A slow walking flag may be used to indicate when the patterns are sufficiently close to known patterns, as may be established by statistics of vertical acceleration, gyroscope magnitude, power spectrum of vertical acceleration and leveled gyroscope measurements. Upon setting the slow walking flag, FFT may be used to identify a candidate cycle. Then, the signal may be portioned into segments corresponding to the candidate cycle and cross correlation applied to determine similarity between segments. When a sufficient number of segments are similar, such as more than one, the non-meaningful motion detection algorithm may return a negative detection. If such segments are substantially different due to the user's motion or the selected candidate cycle, more relaxed conditions may be applied when making a positive detection.

Figure 8:
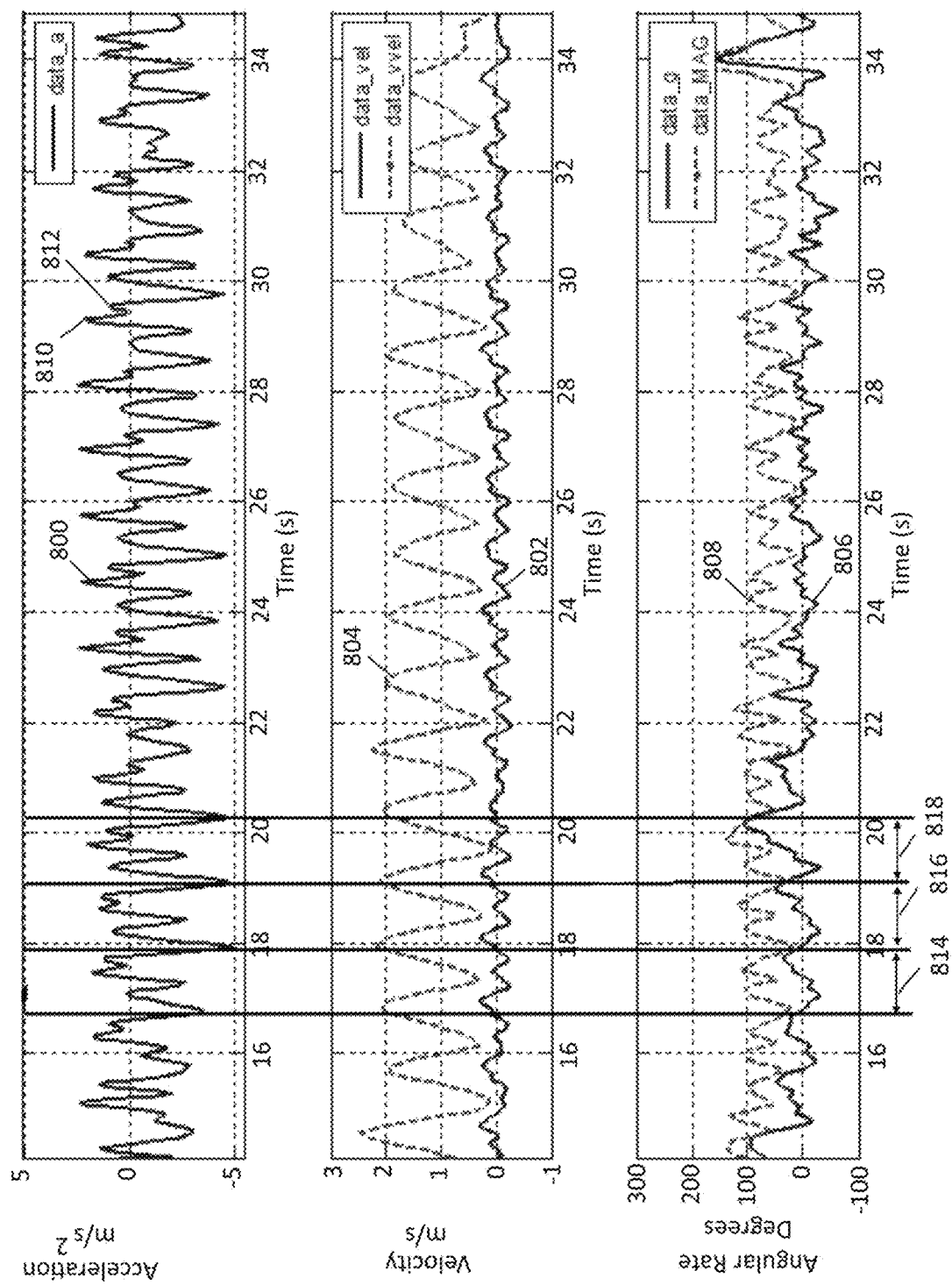
FIG. 8 is a graphical representation of inertial sensor data while walking at normal speed in a dangling use case according to an embodiment.

To help illustrate signal patterns associated with a dangling use case, FIG. 8 depicts signals obtained while walking at normal speed. In the top graph, trace 800 represents data_a, in the middle graph, trace 802 represents data_vel and trace 804 represents data_vvel, and in the bottom graph, trace 806 represents data_g and trace 808 represents data_MAG. As can be seen, vertical acceleration has relatively complicated shape, such that a peaks detection may detect not only high peaks (such as peak 810) but also local high peaks (such as peak 812). Accordingly, non-meaningful motion detection may be configured to account for peak location and amplitude. For example, the two highest frequency components in data_MAG may be matched to the two highest frequency components in data_a. This condition is exhibited by the similarity between segment 814 and segment 816. Detection of such similarity may be associated with a dangling use case, thereby returning a negative detection or a relaxation of criteria for returning a negative detection. This may be confirmed by detection of a dangling use case during motion classification. However, even in characteristic dangling patterns are not found in some segments, such as segment 814, detection of the pattern in other segments, such as segment 816, together with consistent patterns in data_g, data_vel, data_vvel and data_MAG, the non-meaningful motion detection algorithm may make a negative detection or may relax criteria for returning a negative detection.

Figure 9:
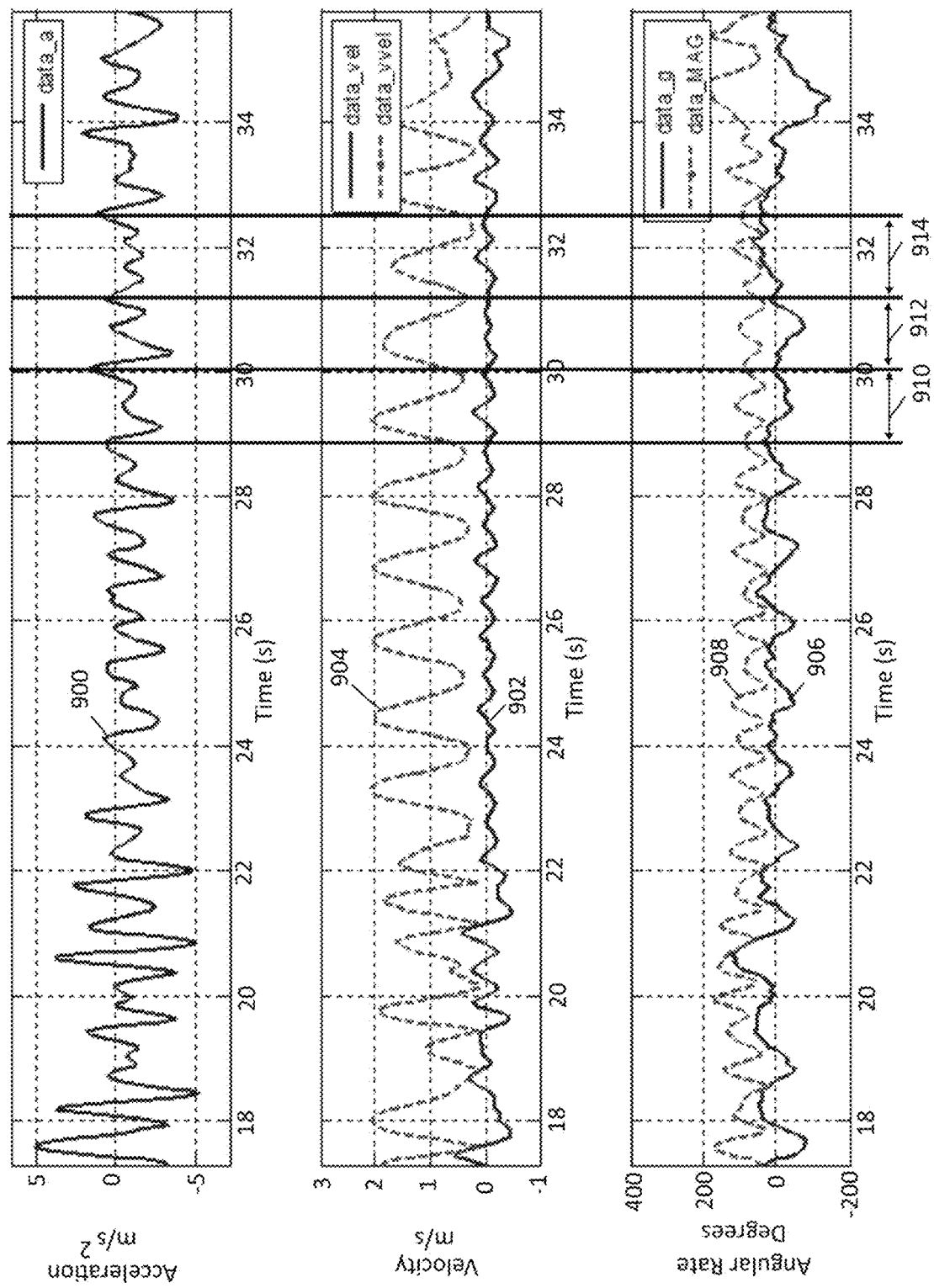
FIG. 9 is a graphical representation of inertial sensor data while walking at slow speed in a dangling use case according to an embodiment.
Figure 10:
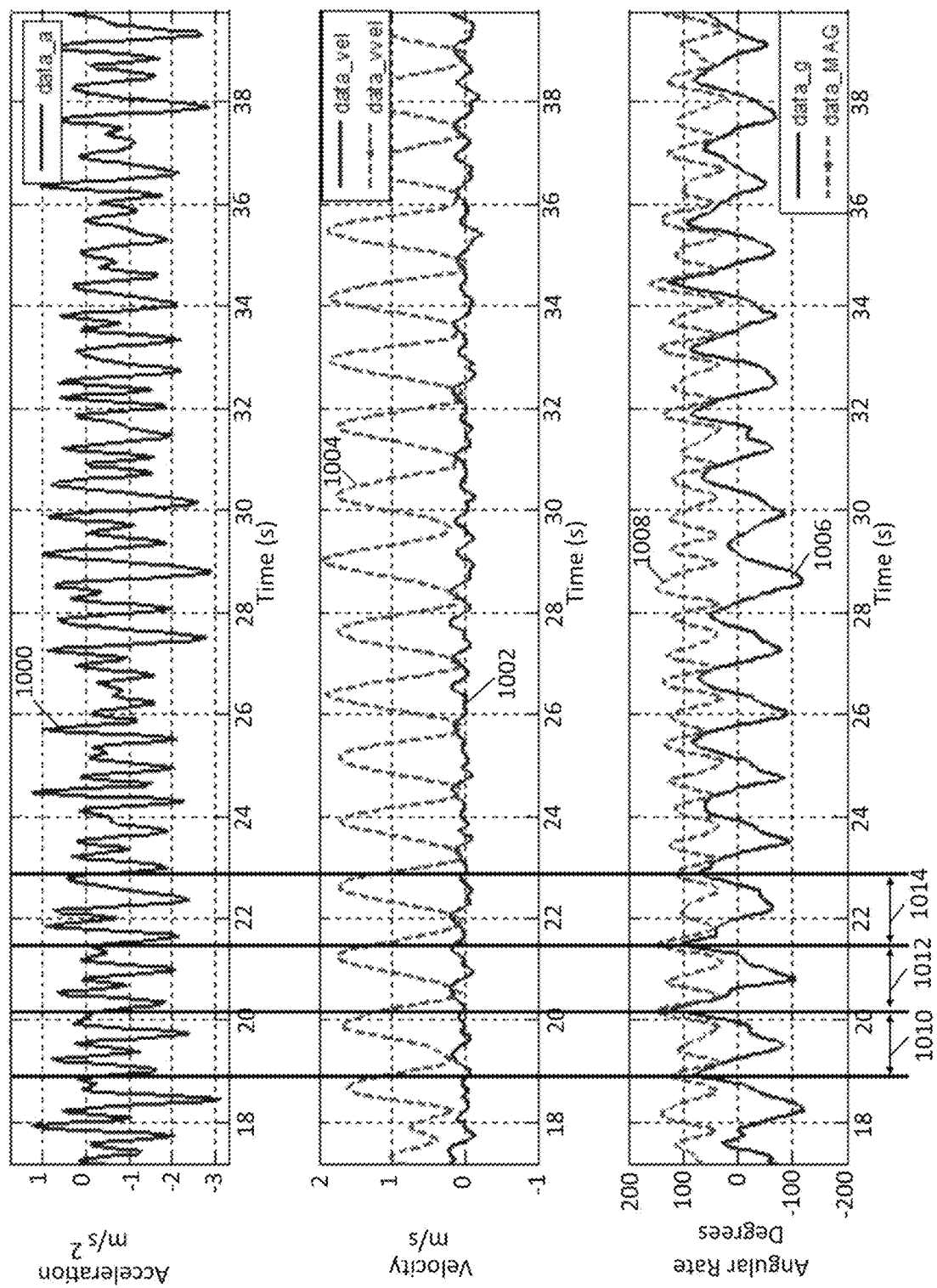
FIG. 10 is a graphical representation of inertial sensor data while walking with small arm swing in a dangling use case according to an embodiment.

A comparison is shown in the context of another dangling use case at slow walking speed in FIG. 9. In the top graph, trace 900 represents data_a, in the middle graph, trace 902 represents data_vel and trace 904 represents data_vvel, and in the bottom graph, trace 906 represents data_g and trace 908 represents data_MAG. A further comparison may be made with regard to a dangling use case at normal walking speed, but a small arm swing as shown in FIG. 10. In the top graph, trace 1000 represents data_a, in the middle graph, trace 1002 represents data_vel and trace 1004 represents data_vvel, and in the bottom graph, trace 1006 represents data_g and trace 1008 represents data_MAG. As can be seen, data_a has a different pattern as compared to FIGS. 7 and 9 and is subject to confusion with non-meaningful motion. When the detected motion is light dangling (using range of acceleration, motion flag and number of significant frequency in power spectrum), the non-meaningful motion detection algorithm may use a sub-algorithm designed to check peaks and pattern regularity in the data_a, data_g and data_MAG for the characteristics shown in FIG. 10 to result in a negative detection. The sub-algorithm may be configured by analyzing data under different conditions, including a light walker, slow walker, and different genders. The sub-algorithm uses detected cycle from FFT to partition the signal into several segments. For example, segment 910, 912 and 914 show consistent signal of data_vvel and data_MAG. This condition is exhibited by the similarity between adjacent segments. Another example is shown in FIG. 10 where the segments 1010, 1012 and 1014 have good similarity of all input signals. Detection of such similarity may be associated with a dangling use case, thereby returning a negative detection or a relaxation of condition for returning a negative detection.

Figure 11:
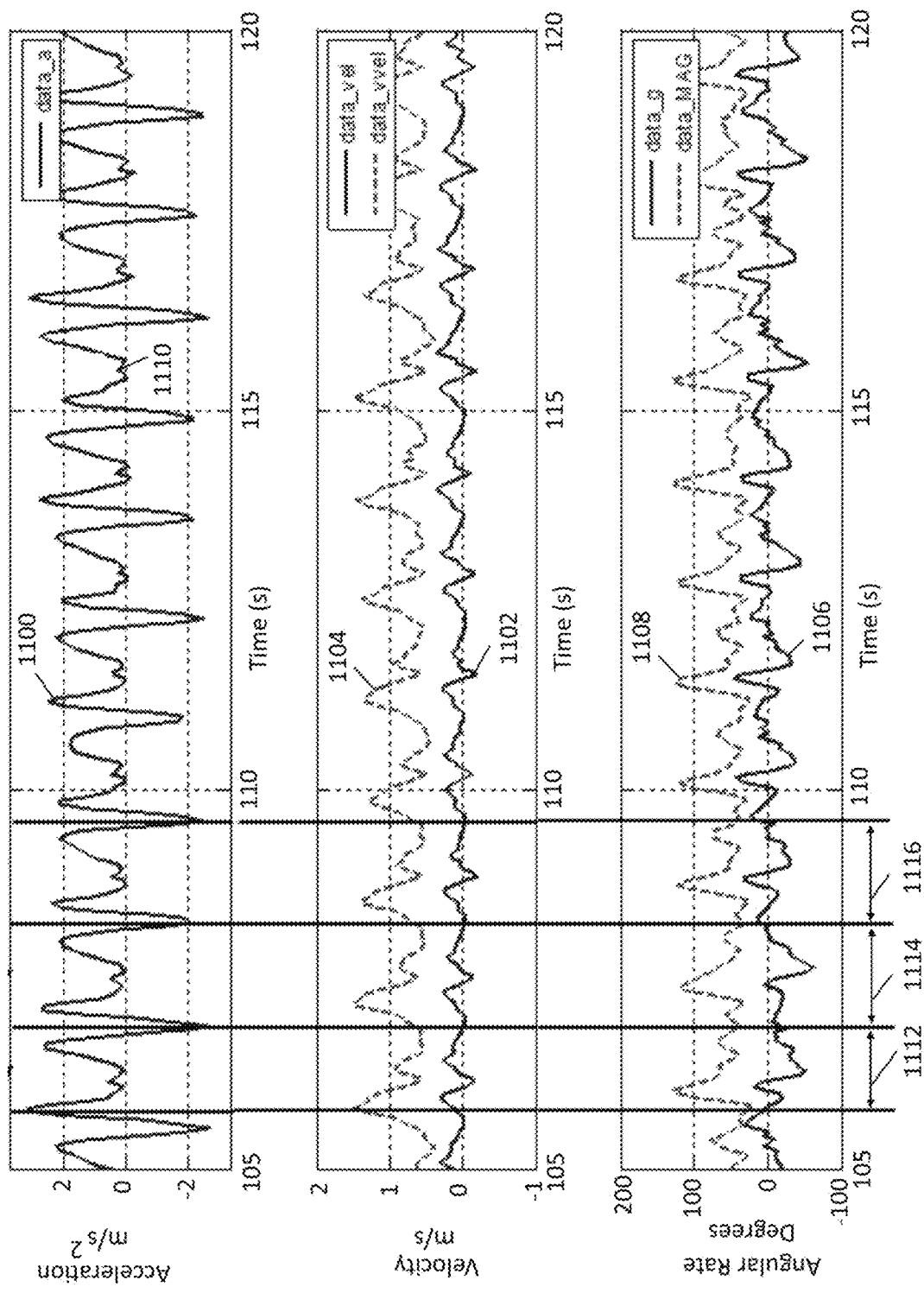
FIG. 11 is a graphical representation of inertial sensor data while walking at normal speed in a pocket mode use case according to an embodiment.
Figure 12:
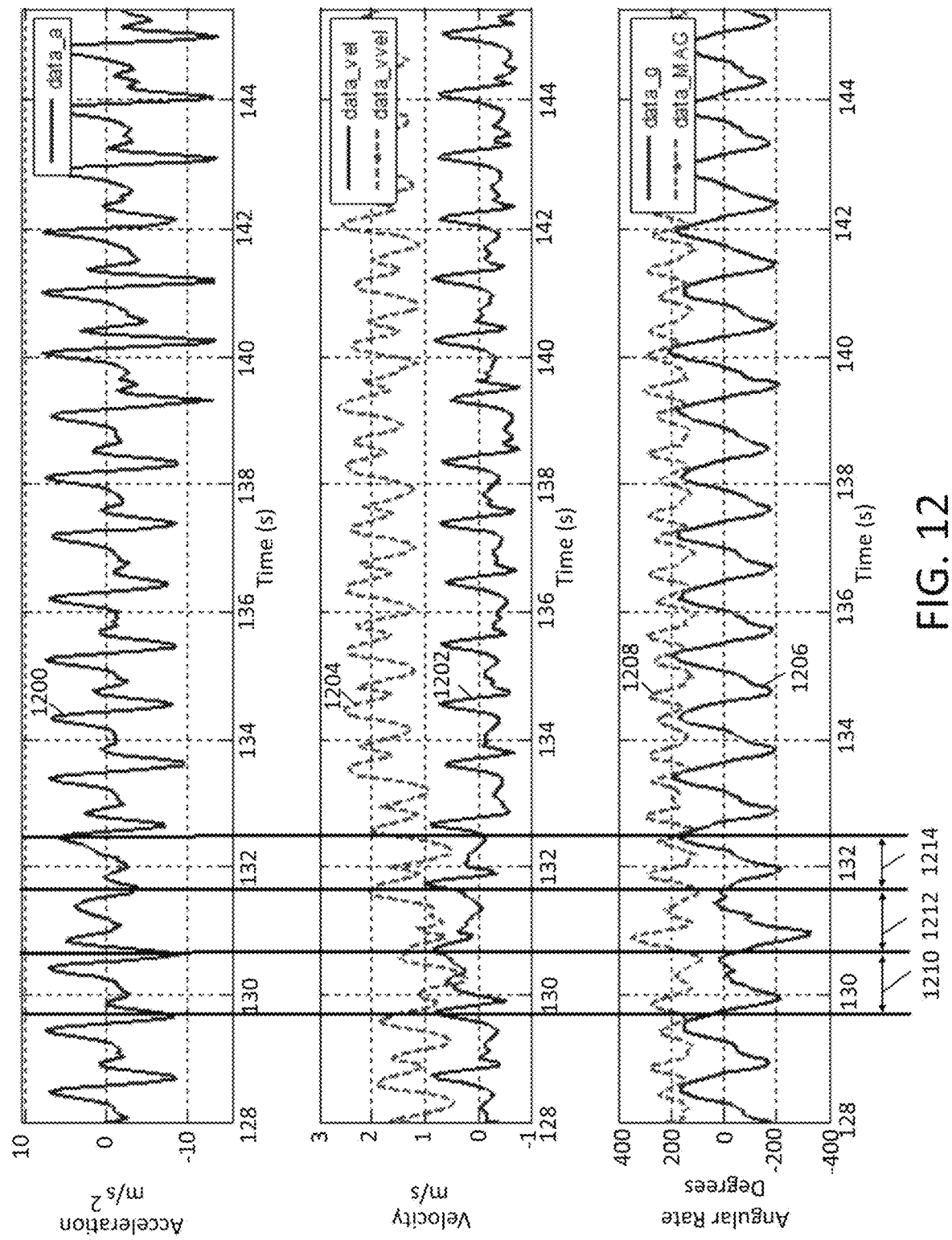
FIG. 12 is a graphical representation of inertial sensor data while walking at fast speed in a pocket mode use case according to an embodiment.
Figure 13:
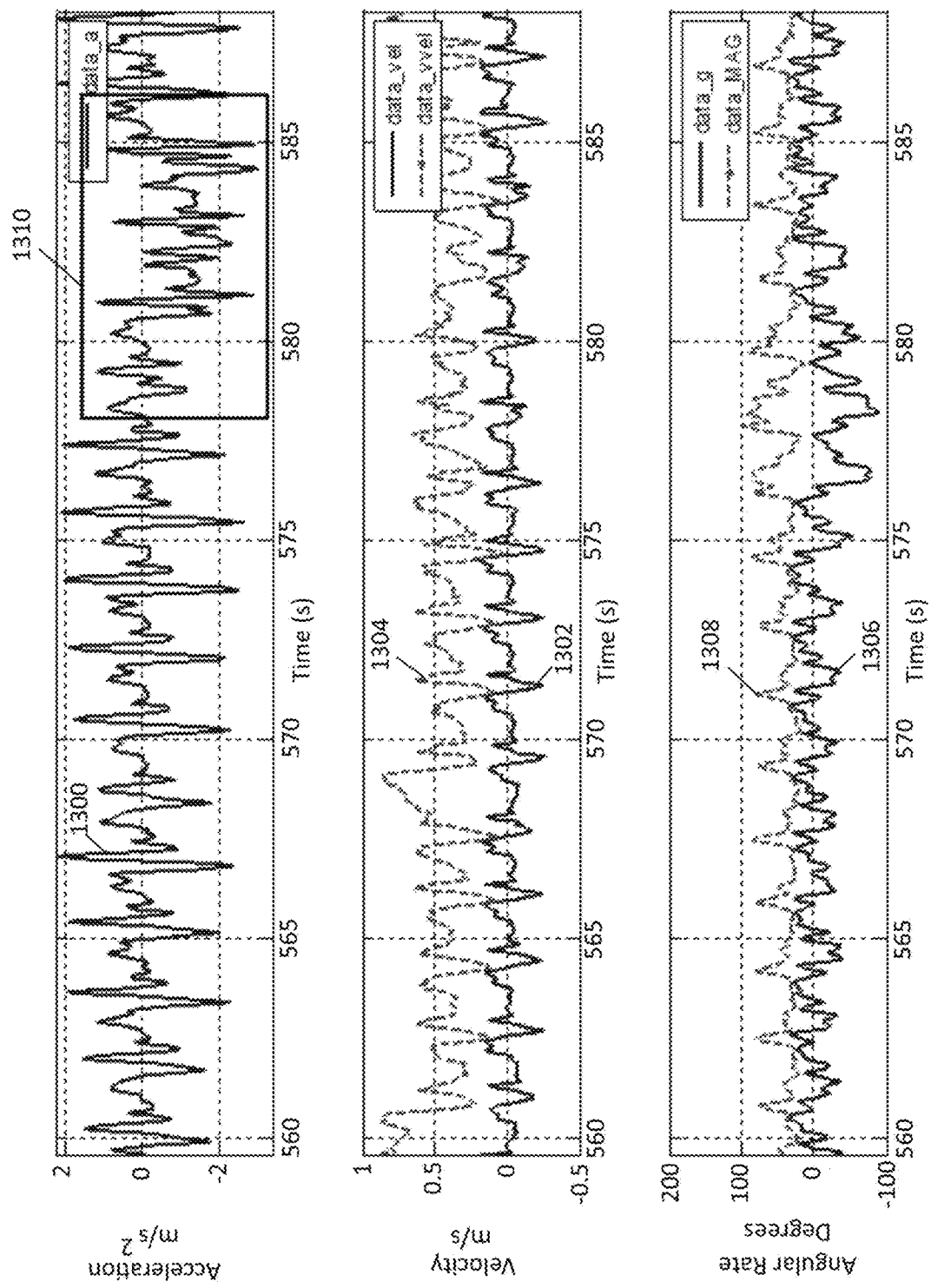
FIG. 13 is a graphical representation of inertial sensor data while walking at slow speed in a pocket mode use case according to an embodiment.

Next, representative patterns corresponding to walking with device 100 in a pocket mode use case at normal, fast and slow speeds are shown in FIGS. 11-13, respectively. In the top graph of FIG. 11, trace 1100 represents data_a, in the middle graph, trace 1102 represents data_vel and trace 1104 represents data_vvel, and in the bottom graph, trace 1106 represents data_g and trace 1108 represents data_MAG. As shown, peak detection may be complicated due to the unstable low peak of trace 1100. However, the non-meaningful motion detection algorithm may be employed to find the segment according to detected frequency components from FFT and two sharp low peaks. When motion classification indicates a pocket mode use case, steps may be protected if more than one segment, such as segments, 1112, 1114 or 1116, are detected within the window. The detected segments need not be consistent in vertical acceleration peaks locations and amplitudes. Likewise, in the top graph of FIG. 12, trace 1200 represents data_a, in the middle graph, trace 1202 represents data_vel and trace 1204 represents data_vvel, and in the bottom graph, trace 1206 represents data_g and trace 1208 represents data_MAG. As can be seen, the patterns of data_g and data_MAG are consistent, with relative peak locations and amplitudes, so the non-meaningful motion detection algorithm may make a negative detection or may relax criteria for returning a negative detection given the detected pocket mode use case. In the top graph of FIG. 13, trace 1300 represents data_a, in the middle graph, trace 1302 represents data_vel and trace 1304 represents data_vvel, and in the bottom graph, trace 1306 represents data_g and trace 1308 represents data_MAG. As shown, slow walking speed in pocket mode may result in different patterns for the signals like in FIGS. 11 and 12. Additionally, there is an irregular phase 1310 which was caused by a reversal of direction during walking. With the optional low pass filter, the peaks of vertical acceleration, down velocity and leveled gyroscope reading still have consistent relationship between high peaks and low peaks. Again, since these patterns are characteristic of slow walking speed in pocket mode, the non-meaningful motion detection algorithm may make a negative detection or may relax criteria for returning a negative detection. Alternatively, no decision may be returned if the confidence is low.

Further illustrations concern patterns known to be characteristic of non-meaningful motion. Different adjustments may be implemented to accommodate different use cases when analyzing the input data. As described, peak detection of the input signals may be used to assess regularity of patterns in the signals. If desired, thresholds may be used to enforce a solution or to accept or refuse peaks. Suitable thresholds include statistics of FFT (frequencies with significant power), range of signals and use cases. Following peak detection, recurring patterns in the power spectrum between certain input signals may be found and assessed for consistency. As warranted, appropriate flags may be used to indicate if the significant frequency components are reasonable according to the frequency relationship between input signals, as well as motion classifications and walking speed determination. Autocorrelation of input vectors may further be used as part of the threshold design. As will be appreciated, this may offer improved performance to the use of maximum autocorrelation values for step detection, as non-meaningful motion may mimic such patterns. Improved performance may also be obtained as compared to standard deviation and autocorrelation techniques, particularly when motion transition occurs in the middle or at the beginning of normal walking.

Additional refinements may be made when determining whether to use a non-meaningful motion detection to overrule a detected step. For example, a detected step may be overruled when one ore more conditions are found to exist. Without limitations, such conditions may include the following: a relatively large range of data_a under a dangling use case; a relatively small range of data_MAG without corresponding consistent peak locations and amplitude in data_a and data_MAG; a relatively large range of data_a under a general use case; and a relatively large range of data_a under a pocket mode use case, subject to confirmation regarding statistics values of other input vectors. Further, when subject to a pocket mode use case, if the characteristics described with respect to FIGS. 11-13 are not detected, other patterns may be matched or a detected step may be protected from being overruled based on segment similarity. For example, if more than one segment is similar to previous segment(s), and optionally if conditions regarding the other input vectors are met, a step detection may be kept and the non-meaningful motion detection algorithm may return a negative detection. In some situations, the signal may not closely match patterns associated with either non-meaningful motion or meaningful motion, requiring further analysis regarding peak numbers, amplitude and cross-correlation on portioned segments among others.

Figure 14:
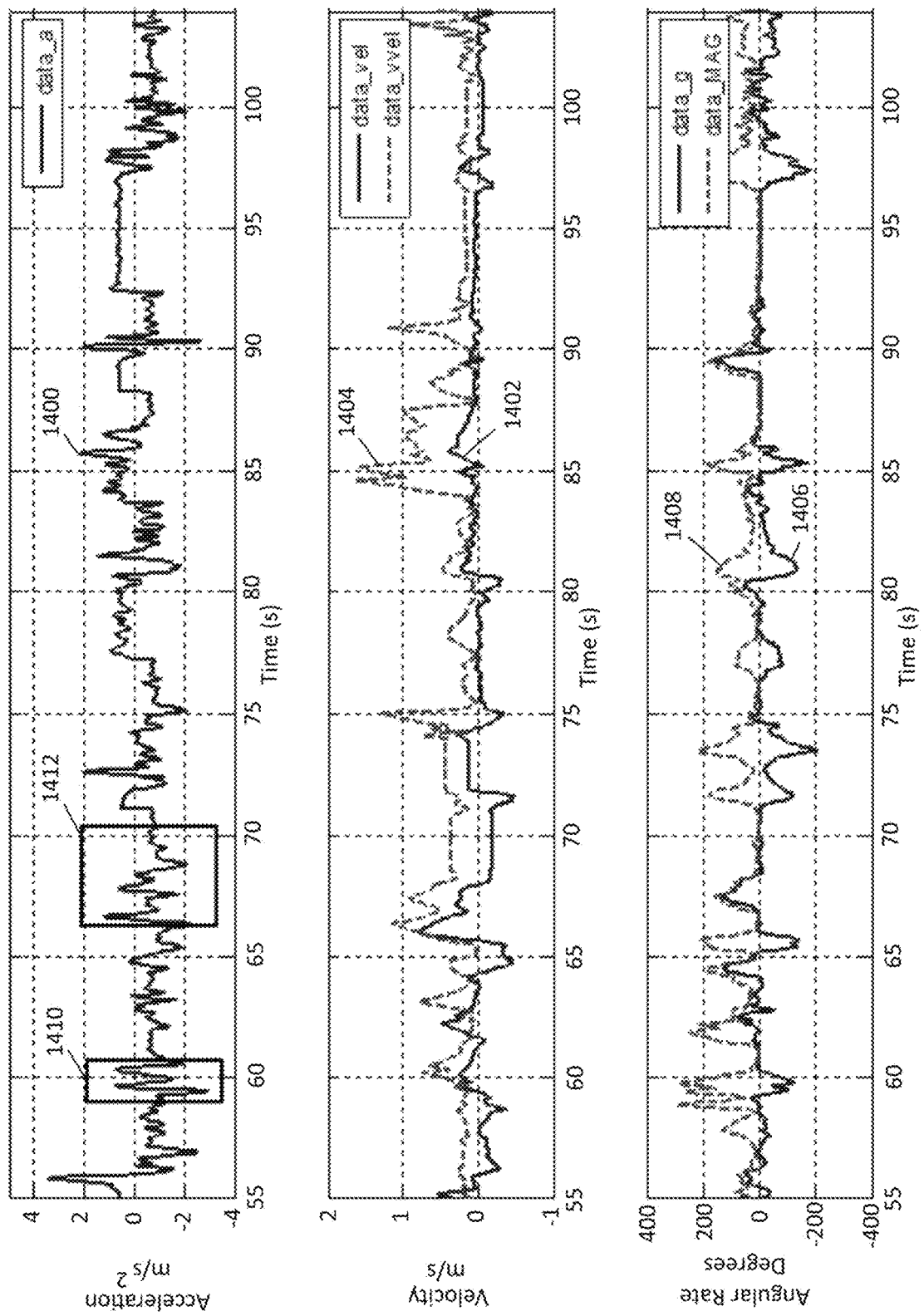
FIG. 14 is a graphical representation of inertial sensor data of non-meaningful motion according to an embodiment.
Figure 15:
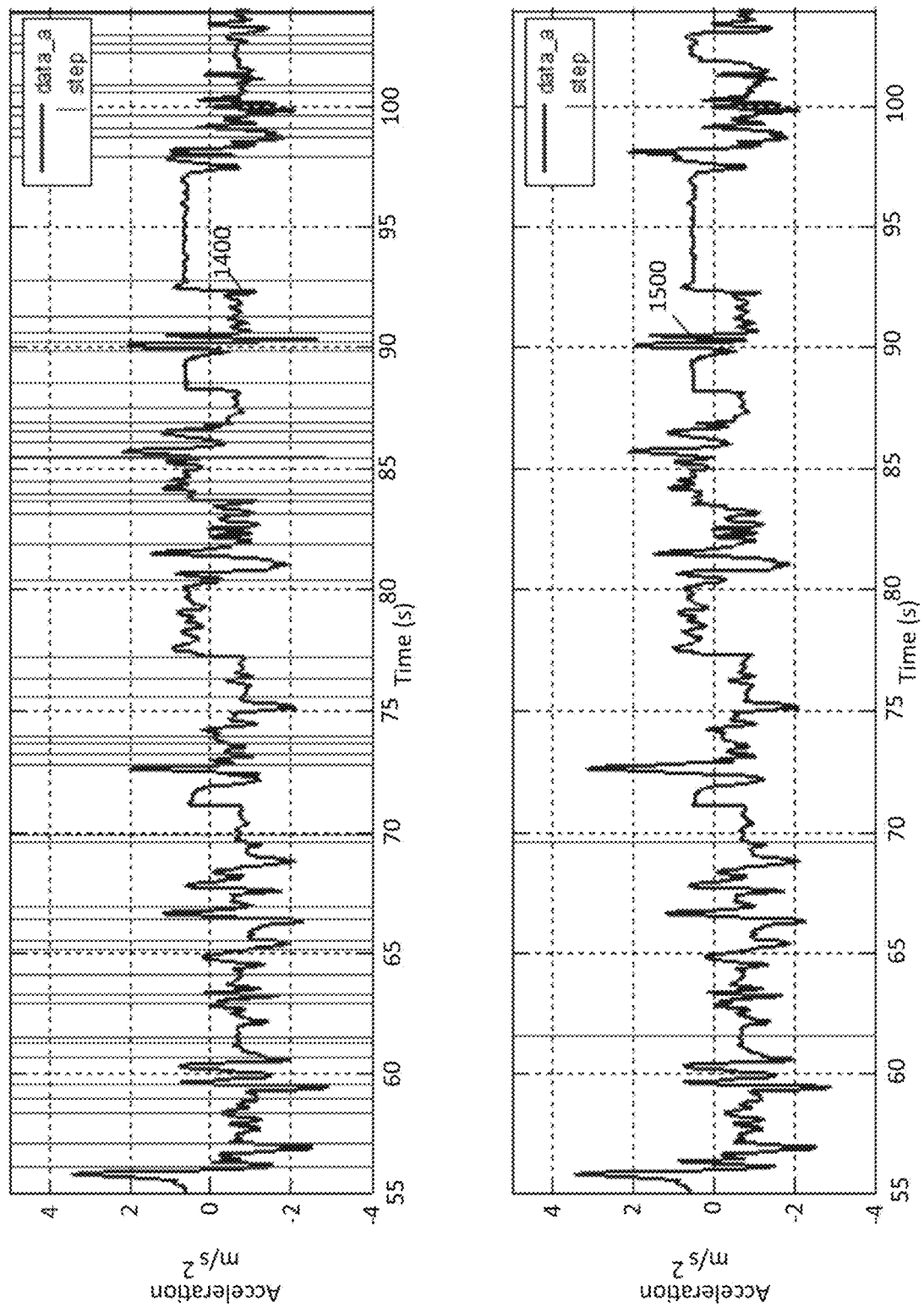
FIG. 15 is a graphical representation of comparing step detection with and without a non-meaningful motion detection algorithm according to an embodiment.

To illustrate these aspect, FIG. 14 depicts an example of non-meaningful motion where segments may exhibit patterns of vertical acceleration consistent with normal steps. By applying the above techniques, the non-meaningful motion detection algorithm may overrule detected steps based on the range of signals, peak relationship. FFT statistics, use case and/or autocorrelation values. Other criteria may be employed as desired. In this example, the input signals were obtained while the device was held and played with by the user in a standing position. In the top graph of FIG. 14, trace 1400 represents data_a, in the middle graph, trace 1402 represents data_vel and trace 1404 represents data_vvel, and in the bottom graph, trace 1406 represents data_g and trace 1408 represents data_MAG. Trace 1400 resembles a pattern consistent with walking under a compass use case algorithm in segment 1410 and resembles a pocket use case in segment 1412. Correspondingly, FIG. 15 compares the results when detected steps are validated using the non-meaningful motion detection algorithm to the results without validation. In FIG. 15, traces 1400 and 1500 represent data_a and each detected step is indicated by a vertical line. In the top graph, trace 1400 demonstrates that without validation using the non-meaningful motion detection algorithm, 51 steps are detected even though all the data corresponds to non-meaningful motion. On the other hand, trace 1500 of the bottom graph shows the results when detected steps are overruled using the non-meaningful motion detection algorithm according to the techniques of this disclosure. As can be seen, only two false positive detections were validated, each resulting from the similarity of segments in window 1410 and 1412 to known use case patterns. As can be seen, application of the non-meaningful motion detection algorithm provides significantly more accurate results. It is to be understood that the shape of vertical acceleration (such as traces 1400 and 1500) might not to be the same in the top and bottom graphs, even though the both represent data_a. With the false detected steps, other navigation algorithms will use the detected steps and feed different information to the integrated navigation solution. The different results of the navigation solution may then change the levelling operation, and consequently the vertical acceleration. The difference between data_a with and without validation using the non-meaningful motion can be very noticeable as seen in some demonstrated figures.

Further aspects of this disclosure may be appreciated in the context of representative results using a test device having characteristics similar to device 100, including the use of a tri-axial magnetometer for auxiliary sensor 116. The test device was used to log data for a large number of pedestrian trajectories for different users with different gaits and different speeds. The trajectories included the different use cases described above, such as hand held in different orientations, dangling, pocket mode in different orientations, as well as and orientations, belt clip devices in different orientations, on ear mode and while being subjected to a variety of non-meaningful motions.

Figure 16:
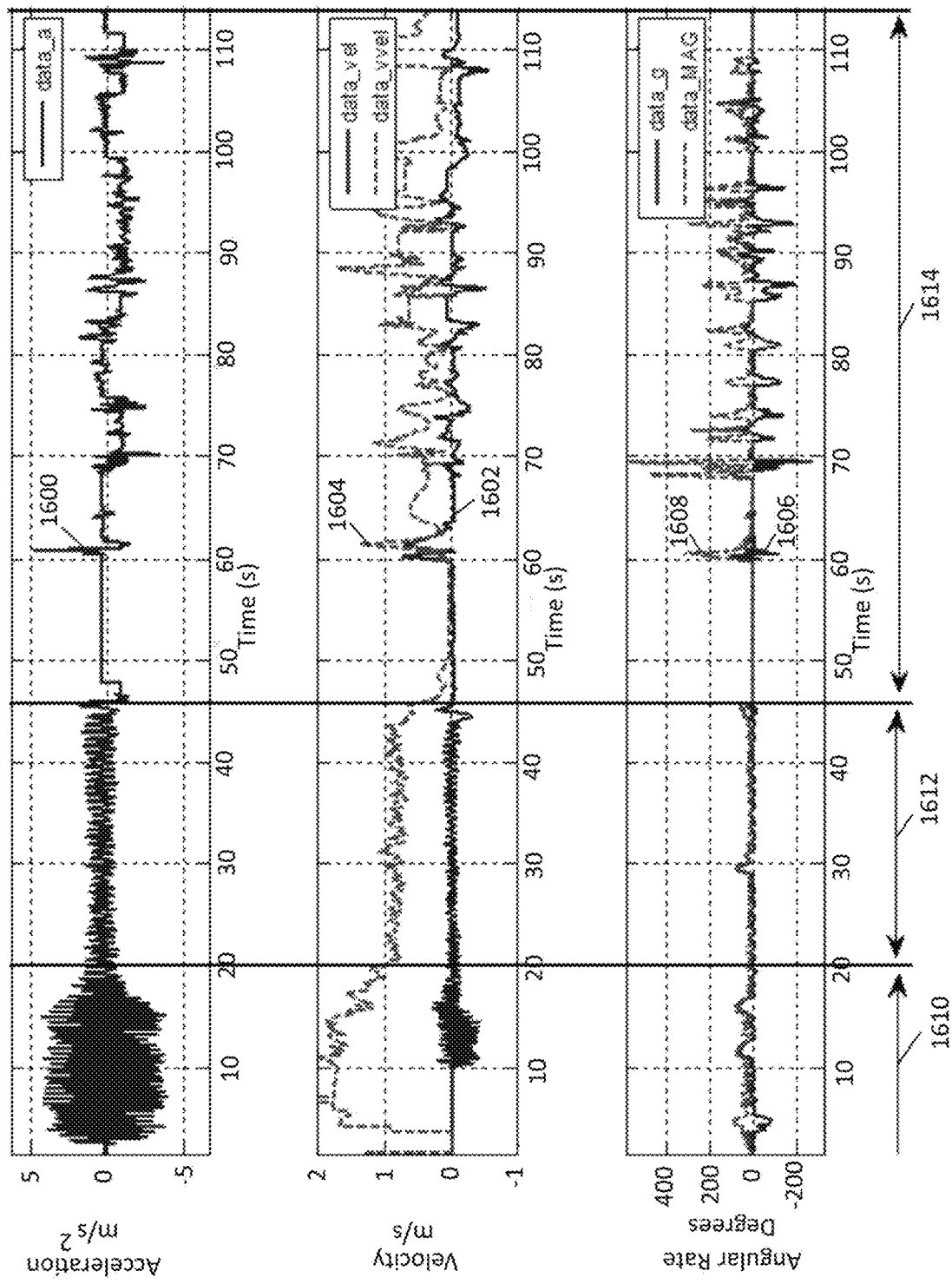
FIG. 16 is a graphical representation of inertial sensor data obtained during a first test trajectory according to an embodiment.

A first representative trajectory involved the user beginning to walk at a fast speed with the test device in hand. The user then stopped walking and put the device on a desk. After around 10 seconds, the user started to play with the device while holding it and remaining in a stationary standing position. The detected motion of the test device is represented by the signals shown in FIG. 16, including trace 1600 representing data_a in the top graph, trace 1602 representing data_vel and trace 1604 representing data_vvel in the middle graph, and trace 1606 representing data_g and trace 1608 representing data_MAG in the bottom graph. The user initially walked at a fast speed as indicated by segment 1610 for the first 20 seconds before slowing down in segment 1612 between 20 seconds to 45 seconds. After 45 seconds, during segment 1614, the test device was either resting on the desk or being subjected to non-meaningful motion by the stationary user.

Figure 17:
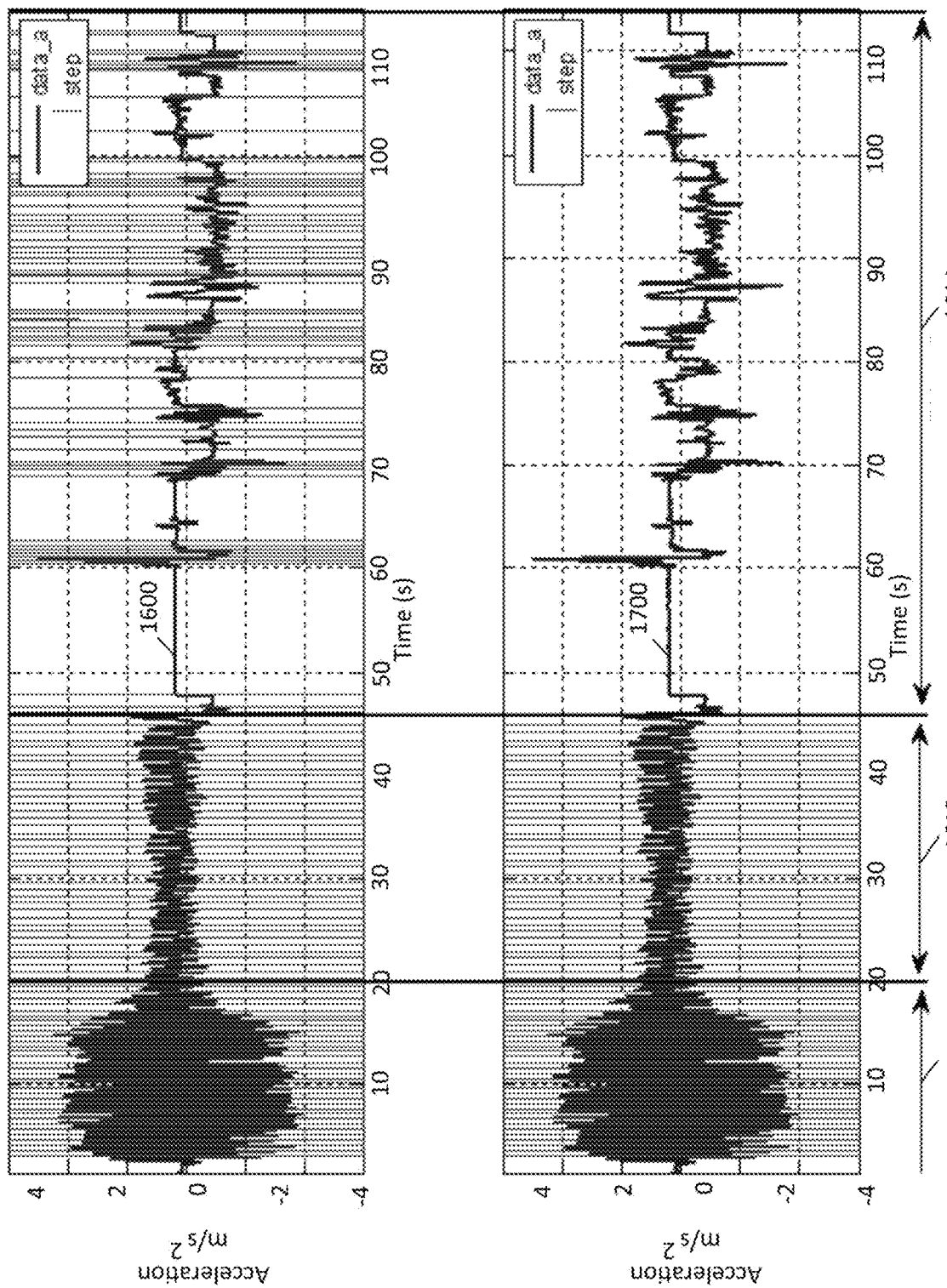
FIG. 17 is a graphical representation comparing step detection with and without a non-meaningful motion detection algorithm for the first test trajectory according to an embodiment.

Next, FIG. 17 shows the results when detected steps are validated using the non-meaningful motion detection algorithm and when no validation is performed. In FIG. 17, traces 1600 and 1700 represent data_a and each detected step is indicated by a vertical line. In the top graph, trace 1600 shows detection of steps without validation using the non-meaningful motion detection algorithm while trace 1700 in the bottom graph shows the results with validation. During segments, 1610 and 1612, corresponding to walking at fast speed and then slower, equivalent step detections resulted. However, without validation, a significant number of steps were detected during segment 1614. By applying the non-meaningful motion detection algorithm, all of these false positive detected steps were overruled.

Figure 18:
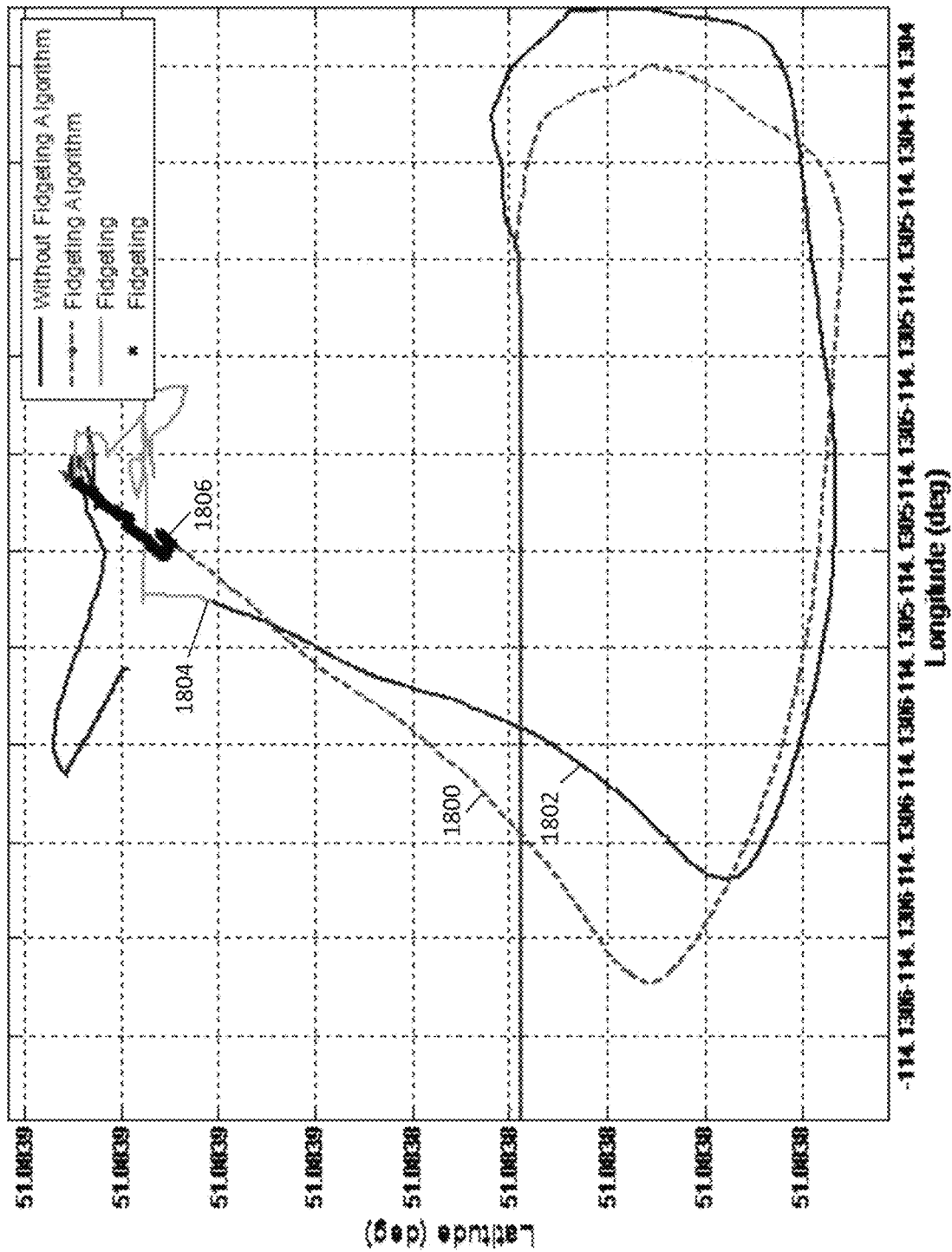
FIG. 18 is a graphical representation of positions derived for the first test trajectory with and without a non-meaningful motion detection algorithm according to an embodiment.

Further, FIG. 18 shows the derived trajectories provided by a navigation solution with and without the non-meaningful motion detection algorithm. Trajectory 1800 represents the navigation solution provided without the non-meaningful motion detection algorithm and trajectory 1802 represents the navigation solution with validation using the non-meaningful motion detection algorithm. Point 1804 represents the transition from segment 1612 to 1614, and all movement afterward in trajectory 1800 results from false positive detection of steps when in fact the test device was undergoing non-meaningful motion. In contrast, the corresponding point 1806 shows that application of the non-meaningful motion detection algorithm provides a more accurate result, as the navigation solution is not incorporating the detected steps that were overruled.

Figure 19:
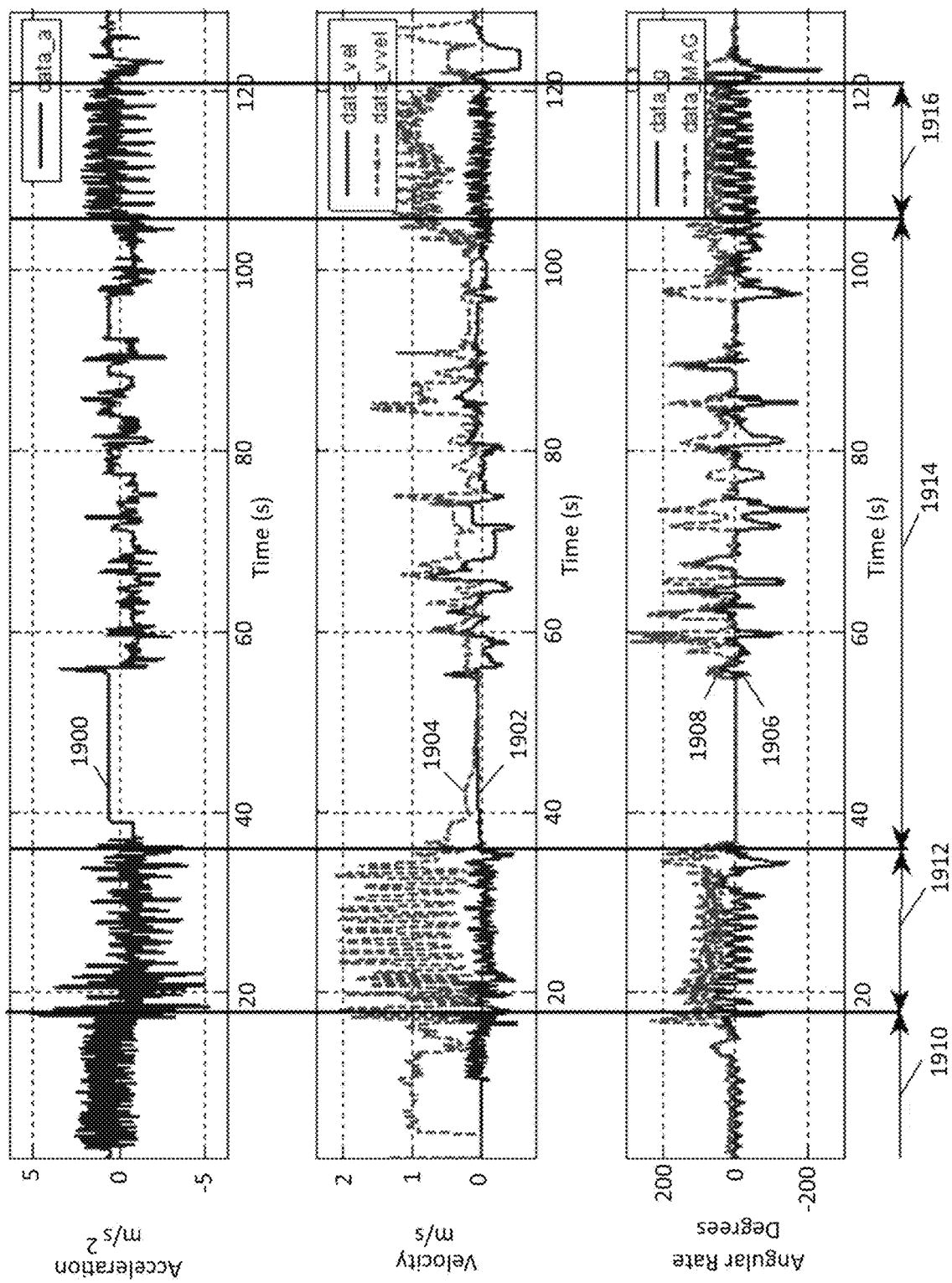
FIG. 19 is a graphical representation of inertial sensor data obtained during a second test trajectory according to an embodiment.
Figure 20:
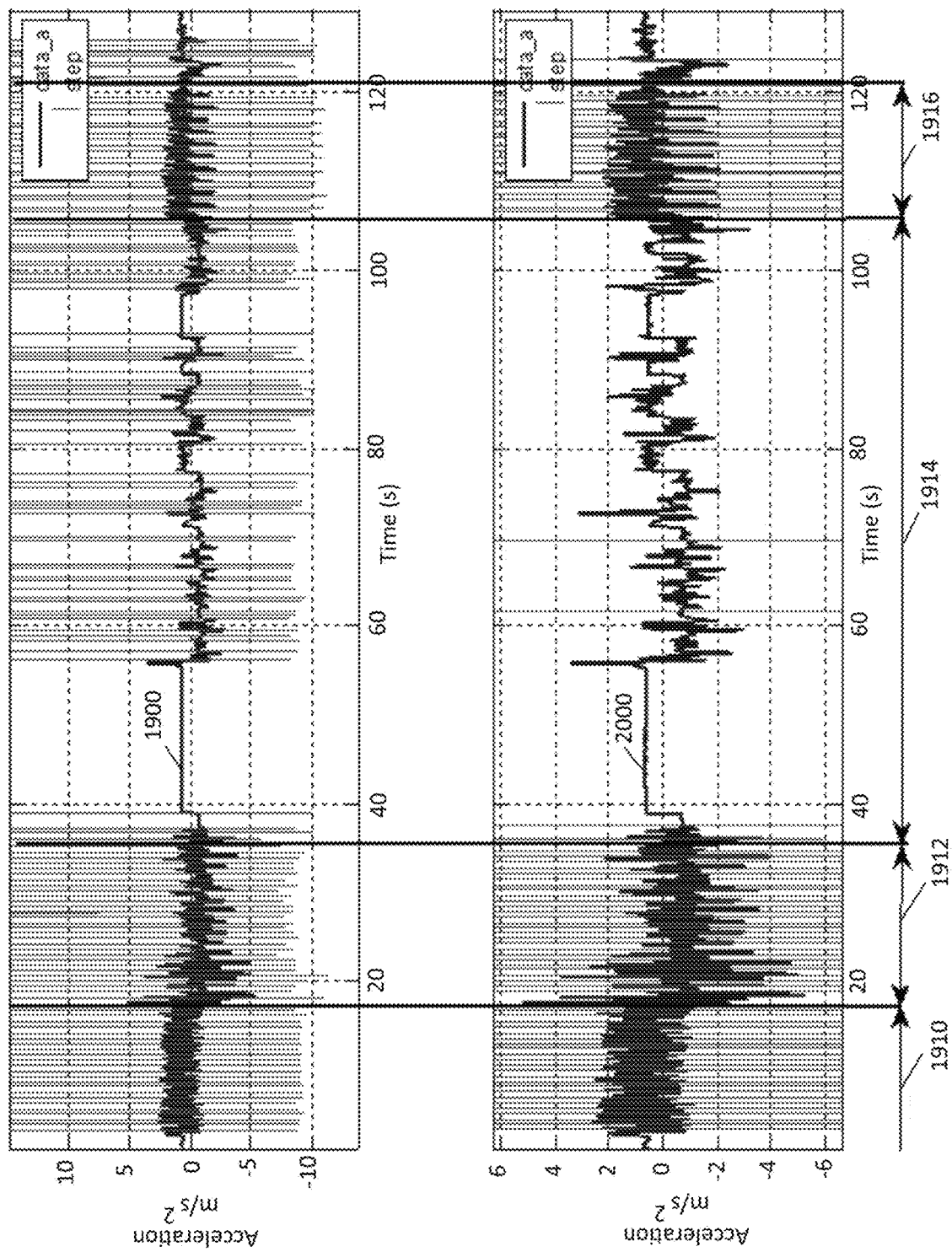
FIG. 20 is a graphical representation comparing step detection with and without a non-meaningful motion detection algorithm for the second test trajectory according to an embodiment.
Figure 21:
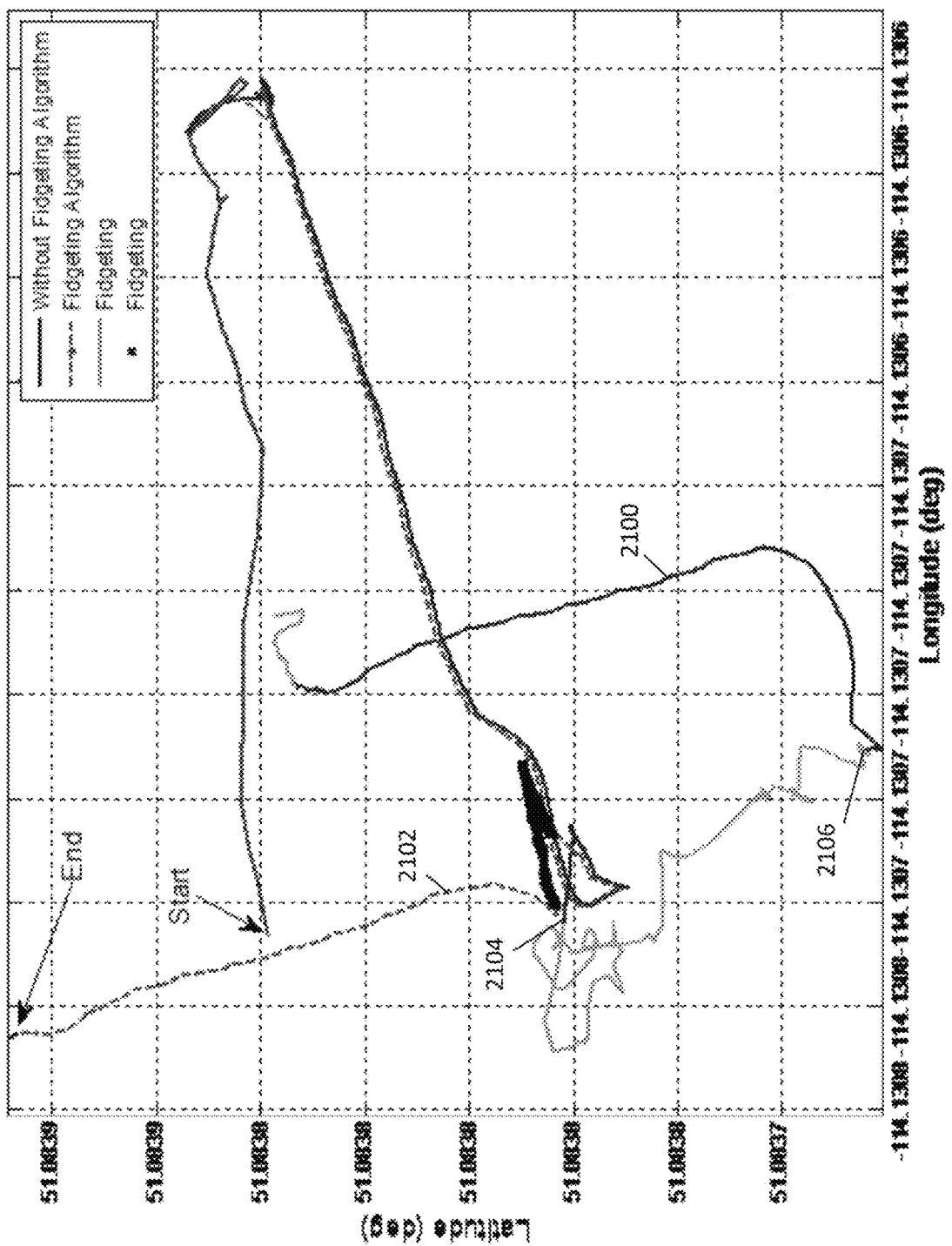
FIG. 21 is a graphical representation of positions derived for the second test trajectory with and without a non-meaningful motion detection algorithm according to an embodiment.

Another representative trajectory is illustrated by FIGS. 19-20. The detected motion of the test device is represented by the signals shown in FIG. 19, including trace 1900 representing data_a in the top graph, trace 1902 representing data_vel and trace 1904 representing data_vvel in the middle graph, and trace 1906 representing data_g and trace 1908 representing data_MAG in the bottom graph. The user began walking with the device in hand in segment 1910. Next, the user transitioned to a dangling use case with the device in the hand beside the body in segment 1912. Then, the test device was placed on a desk in segment 1914 and then used while the user remained stationary. The device was finally placed in a pocket in segment 1916, with the user leaving the room. FIG. 20 shows the results when detected steps are validated using the non-meaningful motion detection algorithm and when no validation is performed. In FIG. 20, traces 1900 and 2000 represent data_a and each detected step is indicated by a vertical line. In the top graph, trace 1900 shows detection of steps without validation using the non-meaningful motion detection algorithm while trace 2000 in the bottom graph shows the results with validation. As shown, false positive steps start to happen during segment 1914 when the user is stationary but interacting with the device. A further sequence of false positives occurs at the end of segment 1914 when the user is placing the device in the pocket. Application of the non-meaningful motion detection algorithm effectively overruled 56 steps that were false positives. Finally, FIG. 21 shows the derived trajectories provided by a navigation solution with and without the non-meaningful motion detection algorithm. Trajectory 2100 represents the navigation solution provided without the non-meaningful motion detection algorithm and trajectory 2102 represents the navigation solution with validation using the non-meaningful motion detection algorithm. As can be seen, without overruling detected steps that correspond to non-meaningful motion, trajectory 2100 begins deviate at point 2104 continues to point 2106. The resulting determinations of the navigation solution are correspondingly inaccurate and do not represent locomotion of the user.

Figure 22:
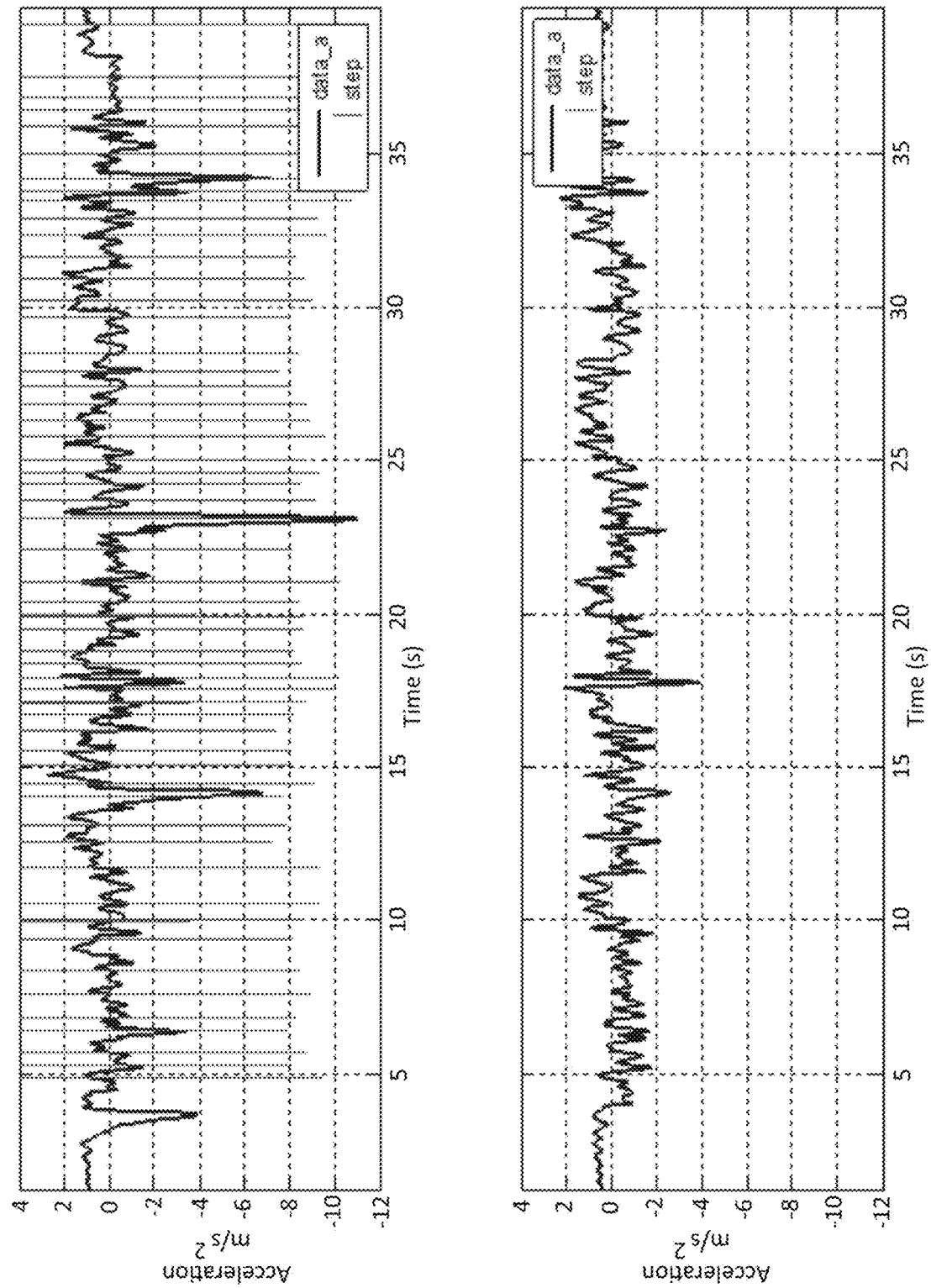
FIG. 22 is a graphical representation comparing step detection with and without a non-meaningful motion detection algorithm for a third test trajectory according to an embodiment.
Figure 23:
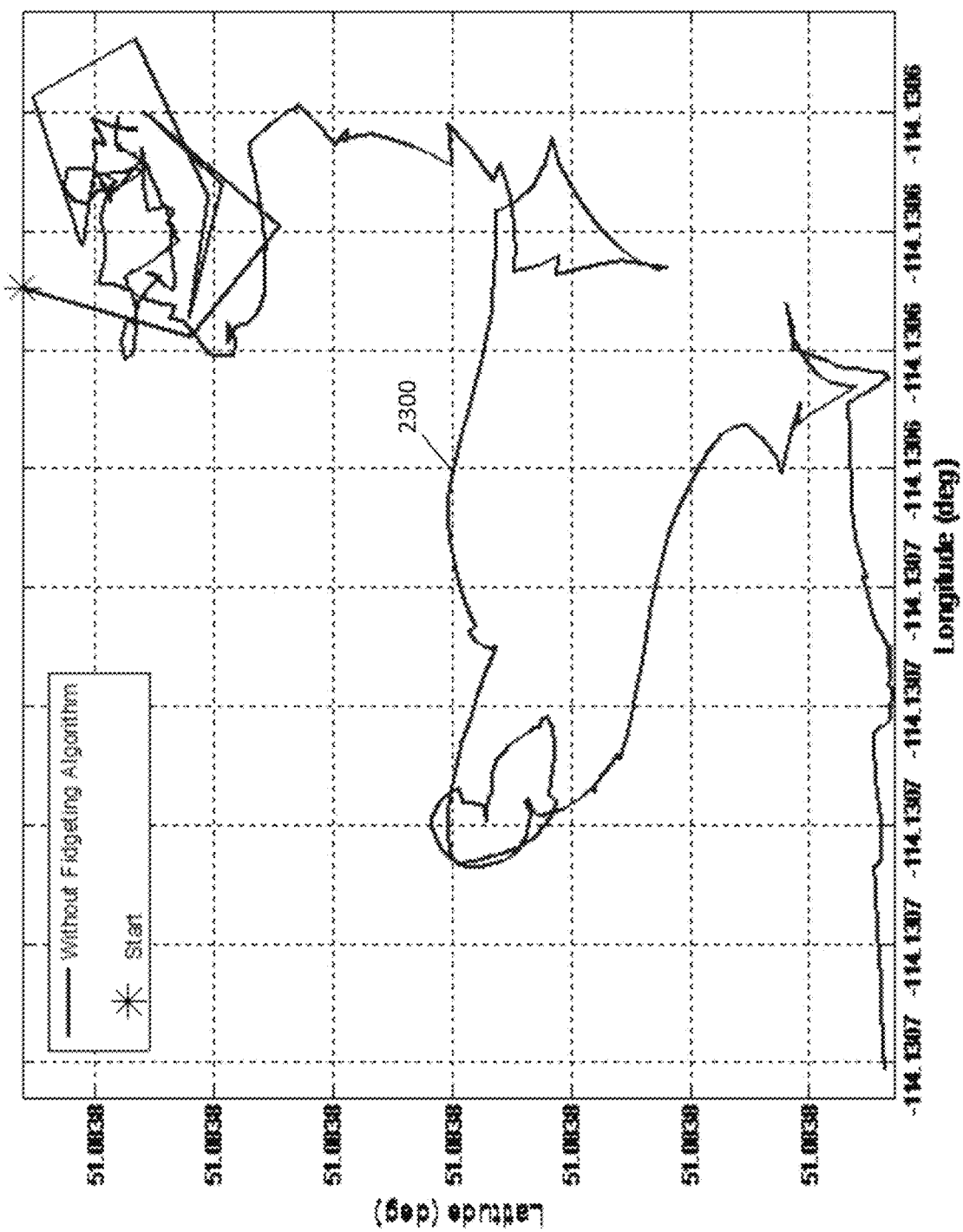
FIG. 23 is a graphical representation of positions derived for the third test trajectory without a non-meaningful motion detection algorithm according to an embodiment.

Yet another representative trajectory is illustrated by FIGS. 22 and 23. In this example, the user performed a calibration of the magnetometer while remaining stationary. FIG. 22 shows the results when detected steps are validated using the non-meaningful motion detection algorithm and when no validation is performed with respect to the data_a signal. The top graph shows detection of steps without validation using the non-meaningful motion detection algorithm while the bottom graph shows the results with validation. As shown, motions experienced by the test device during magnetometer calibration are similar to walking motion, resulting in the detection of 56 steps. On the other hand, use of the non-meaningful motion detection algorithm resulted in all of the false positive steps being overruled. The vertical acceleration in the top graph is different as compared to the one in the bottom graph. This is a normal phenomenon because the false steps detection will feed wrong information to the integrated navigation solution, which will consequently cause differences in the solution such as in attitude and bias estimation, the attitude changes will cause a change in levelling, and as a result will change the shape of the vertical acceleration. The effect of using false positive steps in a navigation solution is illustrated in FIG. 23. Since none of the motion of test device represented meaningful motion, the correct trajectory should have been a stationary position. However, due to the incorporation of detected steps that were not overruled, trajectory 2300 is entirely spurious and demonstrates that without use of the non-meaningful motion detection algorithm, the navigation solution may quickly become inaccurate and unusable.

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

The techniques of this disclosure may be combined with a mode of conveyance technique or a mode detection technique to establish the mode of conveyance. This enables the discrimination of different scenarios such as for example walking and driving among other possible modes.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others, all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for detecting motion with a portable device comprising:
   obtaining inertial sensor data representing motion of the portable device from sensors integrated with the portable device, wherein the inertial sensor data includes accelerometer data and gyroscope data and wherein the portable device is associated with a user;
   processing the accelerometer data;
   processing the gyroscope data;
   identifying non-meaningful motion of the portable device based, at least in part, on the processed accelerometer data and the processed gyroscope data, wherein the identification is based at least in part on at least one of:
      i) matching a temporal sequence of at least one of the accelerometer data and gyroscope data to a known pattern;
      ii) classifying a use case, wherein the use case consists of a type of association of the device with the user, wherein classifying use case consists of classifying the type of association of the device with the user, and wherein the classifying of use case is based at least on one of the processed accelerometer data and the processed gyroscope data;
      iii) assessing a temporal sequence pattern of vertical velocity of the portable device calculated from at least the processed accelerometer data; and
      iv) assessing a temporal sequence pattern of horizontal velocity of the portable device calculated from at least the processed accelerometer data; and
   characterizing a translocation of the user of the portable device based at least in part on the identified non-meaningful motion.

2. The method of claim 1, wherein processing the accelerometer data comprises leveling the accelerometer data to obtain a vertical component.

3. The method of claim 2, wherein processing the accelerometer data further comprises subtracting gravity from the obtained vertical component.

4. The method of claim 1, wherein processing the gyroscope data comprises determining a magnitude for the gyroscope data.

5. The method of claim 4, wherein processing the gyroscope data further comprises leveling the gyroscope data to obtain a horizontal component.

6. The method of claim 1, wherein identifying non-meaningful motion is further based at least in part on a statistical analysis.

7. The method of claim 1, wherein identifying non-meaningful motion is further based at least in part on a frequency analysis.

8. The method of claim 1, wherein identifying non-meaningful motion comprises the matching of at least one of the accelerometer data and gyroscope data to a known pattern.

9. The method of claim 1, wherein identifying non-meaningful motion further comprises adjusting a non-meaningful motion identification based, at least in part, on a history of non-meaningful motion identification for the portable device.

10. The method of claim 1, further comprising classifying motion of the portable device, wherein identifying non-meaningful motion of the portable device is also based on a use case corresponding to the classified motion.

11. The method of claim 1, further comprising deriving a navigation solution for the portable device from the inertial sensor data.

12. The method of claim 11, wherein processing the accelerometer data comprises leveling the accelerometer data using pitch and roll angles from the derived navigation solution to obtain a vertical component.

13. The method of claim 11, wherein processing the gyroscope data comprises leveling the gyroscope data using pitch and roll angles from the derived navigation solution to obtain a horizontal component.

14. The method of claim 1, wherein identifying a non-meaningful motion is based, at least in part, on the temporal sequence pattern of vertical velocity.

15. The method of claim 11, wherein identifying a non-meaningful motion is further based, at least in part, on a temporal sequence pattern of vertical velocity determined from the navigation solution.

16. The method of claim 1, wherein identifying a non-meaningful motion is based, at least in part, on the temporal sequence pattern of horizontal velocity.

17. The method of claim 11 wherein identifying a non-meaningful motion is further based, at least in part, on a temporal sequence pattern of horizontal velocity determined from the navigation solution.

18. The method of claim 1, further comprising performing a filtering operation.

19. The method of claim 1, further comprising characterizing periodic motion of a user of the portable device and assessing the characterization based, at least in part, on the identification of non-meaningful motion.

20. The method of claim 19, wherein characterizing the periodic motion comprises detecting at least one possible periodic cycle and wherein assessing the characterization comprises overruling detection of the at least one possible periodic cycle.

21. The method of claim 20, further comprising estimating a distance traveled by the portable device based, at least in part, on the assessed characterization.

22. The method of claim 20, further comprising updating a navigational solution for the portable device based, at least in part, on the assessed characterization.

23. The method of claim 19, wherein the periodic motion is on foot motion.

24. The method of claim 20, wherein the periodic motion is on foot motion and the possible periodic cycle is a step.

25. The method of claim 1, further comprising characterizing conveyed motion of a user of the portable device and assessing the characterization based, at least in part, on the identification of non-meaningful motion.

26. The method of claim 25, wherein the conveyed motion of the user comprises transport in a vessel.

27. A portable device for detecting motion, wherein the portable device is associated with a user, comprising:
   inertial sensors integrated with the portable device configured to output accelerometer data and gyroscope data; and
   a non-meaningful motion detector configured to:
   process the accelerometer data;
   process the gyroscope data;
   identify non-meaningful motion of the portable device based, at least in part, on the processed accelerometer data and the processed gyroscope data, wherein the identification is based at least in part on at least one of:
      i) matching a temporal sequence of at least one of the accelerometer data and gyroscope data to a known pattern;
      ii) classifying a use case, wherein the use case consists of a type of association of the device with the user, wherein classifying use case consists of classifying the type of association of the device with the user, and wherein the classifying of use case is based at least on one of the processed accelerometer data and the processed gyroscope data;

iii) assessing a temporal sequence pattern of vertical velocity of the portable device calculated from at least the processed accelerometer data; and iv) assessing a temporal sequence pattern of horizontal velocity of the portable device calculated from at least the processed accelerometer data; and characterize a translocation of the user of the portable device based at least in part on the identified non-meaningful motion.

28. The device of claim 27, further comprising a step detector configured to characterize on foot motion of the user.

29. The device of claim 27, further comprising a navigational module configured to determine a navigation solution for the portable device.

30. The device of claim 28, further comprising a navigational module configured to determine a navigation solution for the portable device based, at least in part, on output from the step detector.

31. The device of claim 30, wherein the output of the step detector is assessed using the identification of non-meaningful motion.

32. The device of claim 28, wherein the output of the step detector is assessed using the identification of non-meaningful motion.

33. The device of claim 27, further comprising a periodic motion detector configured to characterize periodic motion of the user.

34. The device of claim 33, further comprising a navigational module configured to determine a navigation solution for the portable device based, at least in part, on output from the periodic motion detector.

35. The device of claim 34, wherein the output of the periodic motion detector is assessed using the identification of non-meaningful motion.

36. The device of claim 33, wherein the output of the periodic motion detector is assessed using the identification of non-meaningful motion.

37. The device of claim 27, further comprising a conveyed motion detector configured to characterize conveyed motion of the user.

38. The device of claim 37, further comprising a navigational module configured to determine a navigation solution for the portable device based, at least in part, on output from the conveyed motion detector.

39. The device of claim 38, wherein the output of the conveyed motion detector is assessed using the identification of non-meaningful motion.

40. The device of claim 37, wherein the output of the conveyed motion detector is assessed using the identification of non-meaningful motion.

41. The device of claim 27, wherein the inertial sensor is implemented as a Micro Electro Mechanical System (MEMS).

* * * * *